(12) United States Patent
Lakic

(10) Patent No.: US 9,909,782 B2
(45) Date of Patent: Mar. 6, 2018

(54) SELF-CONTAINED HEAT-EXCHANGER FOR ELECTRICITY GENERATION

(71) Applicant: Nikola Lakic, Indio, CA (US)

(72) Inventor: Nikola Lakic, Indio, CA (US)

(*) Notice: Subject to any disclaimer, the term of this patent is extended or adjusted under 35 U.S.C. 154(b) by 614 days.

(21) Appl. No.: 13/655,272

(22) Filed: Oct. 18, 2012

(65) Prior Publication Data

US 2013/0055714 A1  Mar. 7, 2013

Related U.S. Application Data

(63) Continuation-in-part of application No. 13/053,029, filed on Mar. 21, 2011, now Pat. No. 8,713,940, which is a continuation-in-part of application No. 12/197,073, filed on Aug. 22, 2008, now Pat. No. 8,281,591, which is a continuation-in-part of application No. 11/770,543, filed on Jun. 28, 2007, now Pat. No. 7,849,690.

(51) Int. Cl.
| | | |
|---|---|---|
| *F03G 7/00* | (2006.01) |
| *F24J 3/08* | (2006.01) |
| *H02K 7/18* | (2006.01) |

(52) U.S. Cl.
CPC ............. *F24J 3/083* (2013.01); *F24J 3/086* (2013.01); *H02K 7/1823* (2013.01); *F24J 2003/088* (2013.01); *Y02E 10/125* (2013.01); *Y02E 10/16* (2013.01)

(58) Field of Classification Search
CPC .......... F01K 7/22; F01K 21/005; F01K 23/04; F01K 3/185; F01K 3/265; F03G 7/04; F24J 3/081–3/086; F24J 3/08; F28D 20/0052; Y02E 10/10; Y02E 10/12; Y02E 10/125; Y02E 10/14; Y02E 10/16; Y02E 10/34; Y02E 10/46; Y02E 60/142; H02K 7/1823
USPC ...... 60/641.1–641.6, 676, 641, 655; 62/260; 159/902; 165/45; 166/57, 302; 290/52
See application file for complete search history.

(56) References Cited

U.S. PATENT DOCUMENTS

| | | | |
|---|---|---|---|
| 3,789,919 A | | 2/1974 | Huber |
| 3,824,793 A | * | 7/1974 | Matthews ................. F03G 7/04 60/641.4 |
| 3,986,362 A | | 10/1976 | Baciu |
| 4,059,959 A | * | 11/1977 | Matthews ................. F03G 7/04 165/45 |

(Continued)

*Primary Examiner* — Jason Shanske
*Assistant Examiner* — Kelsey Stanek
(74) *Attorney, Agent, or Firm* — Schmeiser, Olsen & Watts LLP

(57) ABSTRACT

A method of harnessing geothermal energy to produce electricity by lowering a geothermal generator deep into a pre-drilled well bore below the Earth's surface. The Self Contained In-Ground Geothermal Generator (SCI-GGG) includes a boiler, a turbine compartment, an electricity generator, a condenser and produces electricity down at the heat sources and transports it up to the ground surface by cable. The Self Contained Heat Exchanger (SCHE) is integral part of (SCI-GGG) system and can function independently. It consists of a closed loop system with two heat exchangers. No pollution is emitted during production process. There is no need for hydro-thermal reservoirs although not limited to hot rocks. It can be implemented in many different applications. The SCHE also includes an in-line water pump operatively coupled to the closed loop system and can be used in many different applications.

10 Claims, 17 Drawing Sheets

(56) References Cited

U.S. PATENT DOCUMENTS

| | | | |
|---|---|---|---|
| 4,210,820 A | | 7/1980 | Wittig |
| 4,343,999 A | | 8/1982 | Wolf |
| 4,407,126 A | | 10/1983 | Aplenc |
| 4,448,022 A | | 5/1984 | Aplenc |
| 4,576,006 A | | 3/1986 | Yamaoka |
| 4,641,498 A | * | 2/1987 | Markovitch .............. F01D 1/08 415/202 |
| 4,776,169 A | | 10/1988 | Coles, Jr. |
| 5,058,386 A | | 10/1991 | Senanayake |
| 5,665,242 A | | 9/1997 | Gallup |
| 6,073,448 A | | 6/2000 | Lozada |
| 6,247,313 B1 | * | 6/2001 | Moe ..................... E21B 43/305 60/641.2 |
| 6,259,165 B1 | | 7/2001 | Brewington |
| 6,708,494 B1 | | 3/2004 | Hamann |
| 7,013,645 B2 | | 3/2006 | Brewington |
| 7,185,493 B1 | | 3/2007 | Connelly |
| 7,472,549 B2 | | 1/2009 | Brewington |
| 7,849,690 B1 | | 12/2010 | Lakic |
| 8,281,591 B2 | | 10/2012 | Lakic |
| 2006/0137349 A1 | * | 6/2006 | Pflanz ...................... F03G 6/06 60/641.2 |
| 2007/0289303 A1 | | 12/2007 | Prueitt |
| 2007/0295477 A1 | * | 12/2007 | Mueller .................... F24J 3/08 165/45 |
| 2008/0277492 A1 | | 11/2008 | Cannon |

\* cited by examiner

SELF-CONTAINED HEAT-EXCHANGER FOR ELECTRICITY GENERATION

CROSS REFERENCE TO RELATED APPLICATIONS

This application is a continuation-in-part of U.S. Patent Application to Nikola Lakic entitled "SELF-CONTAINED IN-GROUND GEOTHERMAL GENERATOR," patent application Ser. No. 13/053,029, filed on Mar. 21, 2011, now pending; which is a continuation-in-part of U.S. Patent Application to Nikola Lakic entitled "SELF CONTAINED IN-GROUND GEOTHERMAL GENERATOR," patent application Ser. No. 12/197,073, filed on Aug. 22, 2008, now U.S. Pat. No. 8,281,591, issued Oct. 9, 2012; which is a continuation-in-part of patent application Ser. No. 11/770,543, filed Jun. 28, 2007, entitled "SELF-CONTAINED IN-GROUND GEOTHERMAL GENERATOR," now U.S. Pat. No. 7,849,690, issued Dec. 14, 2010, the disclosures of which are hereby incorporated entirely herein by reference.

BACKGROUND OF THE INVENTION

Technical Field

This invention relates generally to a self-contained in-ground geothermal generator. This invention also relates to the effective method of use of geothermal energy.

State of the Art

Geothermal is a renewable energy source made possible by the same tectonic activity that causes local earthquakes and the rising mountains. Geothermal is endless supply of energy from which we can generate power. The earth's rigged outer shell, the lithosphere, consisting of the crust and upper mantle, rests upon the hotter and more plastic region of the upper mantle, below the crust, called the asthenosphere. The thickness of the Earth's crust varies from a few miles to perhaps hundred fifty miles. Rock heated by magma deep below the surface boils water trapped in underground reservoirs—sometimes as hot as 700 degree F. Some of this hot geothermal water travels back up through faults and cracks and reaches the earth's surface as hot springs or geysers, but most of it stays deep underground, trapped in cracks and porous rock This natural collection of hot water is called a geothermal reservoir. We already enjoy some of this activity via natural hot springs.

Presently, wells are drilled into the geothermal reservoirs to bring the hot water to the surface. At geothermal power plants, this hot water is piped to the surface. Then, after removing silica, steam is created and used to spin turbines creating mechanical energy. The shaft from the turbines to the generator converts mechanical energy to electrical energy. The used geothermal water is then returned down an injection well into the reservoir to be reheated, to maintain pressure, and to sustain the reservoir.

There are three kinds of geothermal power plants. The kind we build depends on the temperatures and pressures of a reservoir.

1. A "dry" steam reservoir produces steam but very little water. The steam is piped directly into a "dry" steam power plant to provide the force to spin the turbine generator. The largest dry steam field in the world is The Geysers, about 90 miles north of San Francisco. Production of electricity started at The Geysers in 1960, at what has become the most successful alternative energy project in history.
2. A geothermal reservoir that produces mostly hot water is called a "hot water reservoir" and is used in a "flash" power plant. Water ranging in temperature from 300-700 degrees F. is brought up to the surface through the production well where, upon being released from the pressure of the deep reservoir, some of the water flashes into steam after removing silica in a 'separator.' The steam then powers the turbines.
3. A reservoir with temperatures between 250-360 degrees F. is not hot enough to flash enough steam but can still be used to produce electricity in a "binary" power plant. In a binary system the geothermal water is passed through a heat exchanger, where its heat is transferred into a second (binary) liquid, such as isopentane, that boils at a lower temperature than water. When heated, the binary liquid flashes to vapor, which, like steam, expands across and spins the turbine blades. The vapor is then condensed to a liquid and is reused repeatedly. In this closed loop cycle, there are no emissions to the air.

It's also a proven, relatively clean energy source. More than 30 nations sitting in earthquake and volcanic zones have extensively used geothermal power for decades.

Existing use of geothermal energy is limited with location. Geothermal resources are limited to the "shallow" hydrothermal reservoirs at the crustal plate boundaries. Much of the world is underlain (3-6 miles down), by hot dry rock—no water, but lots of heat.

Presently, a cross the globe many countries are looking to the heat of hot rocks for future energy need. In areas of the world where steam is not as close to the surface as it is at the geysers, engineers are experimenting with process called "hot dry rock technology" or "Enhance Geothermal System" (EGS).

In hot dry rock geothermal technology there is no steam lock up in the hot rocks that exist down under the crust so scientist in the U.S.A., Japan, England, France, Germany, Belgium and Australia, have experimented with piping water into this deep hot rock to create more hydrothermal resources for use in geothermal power plants. The simplest hot dry rock power plant comprises one injection well and two production wells.

What they try to do is drill down an injection well into the rock and then inject down into the well, under pressure, what ever water source they happen to have on the surface, hoping that it will travel through cracks and fissures as an underground heat exchanger in the hot granite and provide underground reservoir and then drill more production wells around perimeter and try to recover that water and steam and pump it back to surface and then use it in a conventional or in a "binary" power plant.

The invention of the coal-burning steam engine revolutionized industrial production in the $18^{th}$ c. and opened the way to the development of mechanized transport by rail and sea. The modern steam engine, using high-pressure superheated steam, remains a major source of electrical power and means of marine propulsion, though oil has replaced coil as the fuel in many installations and the reciprocating engine has given way to the steam turbines.

Modern wells, mostly used in oil industry and geothermal plants, drilled using rotary drills, can achieve lengths of over 38,000 feet (12 000 meters). The well is created by drilling a hole 5 to 30 inches (13-76 cm) in diameter into the earth. Drilling technology is improving every day.

Accordingly, there is a need in the field of geothermal energy for an apparatus and method for effectively using the enormous heat resources of the Earth's crust that are accessible by using current drilling technology.

DISCLOSURE OF THE INVENTION

The present invention is a new method of using inexhaustible supply of geothermal energy effectively. The present invention relates to a self contained, in-ground geothermal generator, which continuously produces electric energy from renewable geothermal resources. Specifically, this innovative method uses heat from dry hot rocks, thus overcoming serious limitations and obstacles associated with using hydrothermal reservoirs, as is the case in conventional geothermal technology, or in experimental Enhance Geothermal System (EGS). The generator is not limited to the "shallow" hydrothermal reservoirs as is the case in conventional geothermal power plants.

By lowering the unit with cables into pre-drilled well to the desired level and temperature, geothermal energy becomes controllable and production of electric energy becomes available. Electricity is produced by generator at the in-ground unit and is then transported up to the ground surface by electric cable.

We also have developed a new technology for drilling deeper and wider well bores which eliminates limitations, well known in contemporary drilling technologies, relevant to depth and diameter which will drastically reduce drilling cost, as disclosed in U.S. Provisional Application No. 61/276,967, filed Sep. 19, 2009, and Provisional Application No. 61/395,235, filed May 10, 2010—Title: APPARATUS FOR DRILLING FASTER, DEEPER AND WIDER WELL BORE; U.S. Provisional Application No. 61/397,109, filed: Jun. 7, 2010—Title: PROPOSAL FOR CONTROLLING DISFFUNCTIONAL BLOW OUT PREVENTER; International Application Number: PCT/US10/49532—Filed on Sep. 20, 2010, (after holyday)—Title: APPARATUS FOR DRILLING FASTER, DEEPER AND WIDER WELL BORE, the disclosures of which are incorporated by reference.

Relatively cheap and clean electric energy continuously produced from geothermal renewable source, beside common use in homes and businesses, can be used for production of hydrogen which can be used as a clean source of energy in many applications including the auto industry or can be used to recharge electric car batteries, and can eventually replaced depleting, expensive and polluting oil, coal and other fossil fuels, which are used to create electricity. Nuclear power plants with very toxic waste material can also be replaced.

The self contain in-ground geothermal generator comprises a slim cylindrical shape, which, positioned vertically, can be lowered with a system of cables deep into the ground in a pre-drilled well. The self contained generator includes a boiler with water or working fluid, turbines, a gear box, an electric generator, a condenser distributor, a condenser with a system of tubes for returning water back into the boiler, an electric cable for transporting electric energy up to the ground surface and a cooling system which comprises a separate system of close loop thermally insulated tubes, which are connected with heat exchanger on ground surface.

The self contained in-ground geothermal generator also contains an internal and external structural cylinder. The space formed between external and internal cylinders and plurality of tubes within is part of the condenser which cools and converts exhausted steam back in liquid state and returns it back as feed water into boiler for reheating.

In this method of using the geothermal generator, water or working fluid contained within the boiler is converted to high-pressure, super heated steam due to heat from hot rocks contained within a pre-drilled well below the Earth's surface. The steam is used to produce electric energy which is transported up to the ground surface by the electric cable.

The cooling system is a close loop tube which cools condenser by circulating water through the peripheral chamber of the condenser, formed between external and internal cylinders, and then transfers the heat up on ground surface through thermally insulated pipes. The heat on ground surface is then used to produce additional electricity in a "binary" power plant through system of several heat exchangers. The peripheral chamber of the condenser surrounds and cools turbine and electric generator departments. Alternatively, the heat exchanger on surface can be used for heating individual buildings.

The cooling system for self contained geothermal generator is an independent close loop tube system, which, as an alternative system, can be modify and operate independently as a heat exchanger. Namely, instead circulating water through condenser formed between external and internal cylinders, it can circulate water through coiled pipe, which function as a heat exchanger, deep in ground, and then exchange heat up on the ground surface through system of heat exchangers. Both of these two close loop systems, (cooling system for self contained in-ground geothermal generator and an independent in-ground heat exchanger) have thermally insulated pipes to prevent heat exchange between heat exchangers and have at least one water pump to provide liquid circulation through the pipe line and to reduce hydrostatic pressure at the lower part of the close loop system.

There are many areas in many countries with earthquake and volcanic zones where hot rocks can be reached in relatively short distance from the ground surface.

Self contained geothermal generator is lowered deep in ground to the hot rocks. The bottom part of the boiler may have several vertical indents (groves) to increase its conductive surface thereby increasing conductivity of heat from hot rocks to the water inside boiler, which produces high-pressure superheated steam, which than turns the turbines.

The axle of the turbine is a solid shaft and is connected to the axle of the rotor of the electric generator, which is a cylindrical shaft that rotates within generator and produces electricity. The cylindrical shape of the rotor shaft allows for steam to pass through to the condenser's distributor. The cylindrical shaft of the rotor also functions as a secondary turbine. It has a secondary set of small blades attached to the inside wall and positioned to increase the rotation of the rotor. Exhausted steam then reaches the condenser through a system of tubes where the steam condenses and returns to the boiler as feed water through a feed water tank. This process is repetitive and is regulated with two sets of steam control valves and boiler feed water pumps, which can be activated automatically by pressure or heat or electronically by sensors and a computer in a control room on the ground surface.

The purpose of the gear box, or converter, which is located between the turbines and the generator, is to neutralize momentum produced by the spinning turbines by changing the direction of the rotor of the generator. Thus the rotor of the generator spins in the opposite direction than the main turbines.

The boiler of the self contained in-ground geothermal generator is filled with water after all assembly is lowered to the bottom of the well through separate set of tubes to reduce weight of whole assembly during lowering process. The same tubes are also used to supply, maintain and regulate necessary level of water in boiler.

The condenser which surrounds and cools turbine and electromagnetic generator, but not boiler, is insulated from external heat of hot rocks with tick layer of heat resistant insulation. An additional peripheral layer of insulation can be aluminum foil. Whole assembly of the self contained in-ground geothermal generator can be treated with special coat of rust resistant material.

The boiler of the assembly can be filled, beside water, also with liquid, such as isopentane, that boils at a lower temperature than water to make the unit functional at less dept or a lower temperature.

Also, coolant for condenser can be filled, beside water, with other liquid with higher boiling point than water.

The step-up transformer can be added on top of unit or can be separated from assembly and carried with separate cable to reduce the weight of the assembly. If needed, several transformers can be added and spaced at necessary distance (levels). (Transformer is not illustrated in the drawings). Within the transformer, the voltage is increased before the power is sent to the surface and power lines to carry electricity to homes and businesses.

In the boiler there is a safety check valve to release steam, if needed, in emergency such as if control valves malfunction.

There is a set of protruded holding pins on each assembly segment so it can be carried with a set of separate cables to reduce tension on main cable during lowering or lifting of the assembly.

There are structural ribs between internal and external cylinders to improve structural integrity of the assembly in high pressure environment.

All segments can be welded or bolted on surface during lowering process.

All carrying cables, supply tubes, coolant tubes, control cables, lubrication line and electric cable are at appropriate length segmented to be easily attached and reattached.

After well is drilled the portable or permanent tower can be built with system of ratchets for lowering or lifting the assembly.

The potential for geothermal energy is huge. The Earth has an inexhaustible supply of energy. The question was, until now, how to use that heat effectively.

With invention presented here, SELF CONTAIN IN-GROUND GEOTHERMAL GENERATOR ("SCI-GGG") and SELF CONTAINED IN-GROUND HEAT EXCHANGER ("SCI-GHE"), we will be able to tap the true potential of the enormous heat resources of the earth's crust.

One objective of this invention is a method to provide relatively cheap and clean electric energy continuously produced from geothermal renewable source—not limited to the "shallow" hydrothermal reservoirs. Beside common use in homes and businesses, it can be used for production of hydrogen which can be used as a clean source of energy in many applications including auto industry and eventually replaced depleting, expensive and polluting oil, coal and other fossil fuels which are used to create electricity. Nuclear power plant with very toxic waste material can also be replaced.

Another objective of the SCI-GHE system is to be used in reverse order to heat (warm) the ground adjacent solidified oil formations in order to liquefy it for easier extraction to the ground surface.

A further objective of this invention is to provide geothermal generator assembled in vertical position, containing boiler with water, turbines, an electric generator, condenser with system of pipes returning feed water back to the boiler.

A still further objective of this invention is to provide a gear box (converter) located between turbines and generator to neutralize momentum produced by spinning turbines, by changing direction of the rotor of the generator to spin in opposite direction of the main turbines.

Another objective of this invention is that the cooling system is independent close loop tube which has at least two heat exchangers; first one down in the well and second one on the ground surface. First one which absorbs heat from condenser by circulating cool water through the peripheral chamber of the condenser, formed between external and internal cylinders, and then transfers the heat up on ground surface where heat is exchanged through second heat exchanger, which is a coiled pipe coupled into binary power unit, and then cooled water returned to the condenser again.

A further objective of this invention is that independent close loop tube has at least one pump to circulate water through the system, and to reduce hydrostatic pressure.

A further objective of this invention is that an alternative independent close loop tube system which has at least two heat exchangers; first one which is a coiled pipe (tube) down in the well and second one which is also a coiled pipe (tube) on the ground surface. First one which absorbs heat from surrounding hot rocks by circulating cool water through heat exchanger (coiled pipe) and then transfers the heat up on ground surface through thermally insulated pipe where heat is exchanged through second heat exchanger (also a coiled pipe).

A farther objective of this invention is that independent close loop tube has at least one pump to circulate water through the system, and to reduce hydrostatic pressure. (The ratio of the speed and pressure inside the closed loop line are constant. P (pressure)×V (speed)=constant. More speed=less pressure.)

A further objective of this invention is that each of those two close loop systems, whether cooling system for self contained in-ground geothermal generator or an independent in-ground heat exchanger provides slim cylindrical design which is suitable to functions in a single well with a set of powerful in-line pumps to provide substantial fluid flow.

Another objective of this invention is to provide structural external and structural internal cylinders with a cooling chamber, the condenser formed between them, which surrounds and cools turbine and electric generator departments.

A further objective of this invention is that there are structural ribs between internal and external cylinders to improve structural integrity of the assembly in high pressure environment.

A still further objective of this invention is that all carrying cables, supply tubes, coolant tubes, control cables and electric cable are at appropriate length segmented to be easily attached and reattached to the cables connector platforms.

A further objective of this invention is that external structural cylinder of the boiler has external and internal indentations to increase conductive surface and to increase conductivity of heat to the water inside boiler.

Another objective of this invention is that the boiler of the self contained in-ground geothermal generator can be filled with water after whole assembly is lowered to the bottom of the well through separate hose to reduce weight of whole assembly during lowering process.

Another objective of this invention is that necessary level of water inside the boiler of the self contained in-ground geothermal generator can be supplied and regulated from control room on ground surface.

A farther objective of this invention is that condenser which surrounds and cools whole unit, except boiler, is insulated from external heat of hot rocks with tick layer of heat resistant insulation.

Another objective of this invention is that there is a set of protruded holding pins on each assembly segment so it can be carried with set of separate peripheral cables to reduce tension on main cable during lowering or lifting the assembly.

It is also an objective of this invention that geo-thermal energy becomes controllable and production of, relatively cheap, electric energy available by lowering unit with a cable into a pre-drilled well to the desired level and temperature.

A further objective of this invention is that electricity is produced by a generator at the in-ground unit and transported to the ground surface by electric cable.

Another objective of this invention is that the heat exchange systems whether used to cool condenser of the geothermal generator or independent in-ground a coil—heat exchanger to absorb heat from hot rocks consist of closed loop system further comprises a series of in-line water pumps periodically inserted along the closed loop line wherein each of the in-line water pumps consist of electromotor comprising spiral blade within a hollow central shaft of the rotor creating a force to move fluid through the closed loop line.

A further objective of this invention is that assembling tower can be used as a platform for wind mill if geothermal power plant is located in windy area.

It is also an objective of this invention that this method of producing electric energy can be used in global climate crises, which could happen, such as ice age, in which instant agriculture could continue in green houses gardens where artificial lights and heat are applied.

A further objective of this invention is that method of producing electricity with the self contained in-ground geothermal generator can be applied on another planets and moons with geothermal potential and where sun-light is insufficient.

The foregoing and other features and advantages of the present invention will be apparent from the following more detailed description of the particular embodiments of the invention, as illustrated in the accompanying drawings.

BRIEF DESCRIPTION OF THE DRAWINGS

The invention will be described with reference to the figures of which.

DETAILED DESCRIPTION OF THE INVENTION

Figure 1:
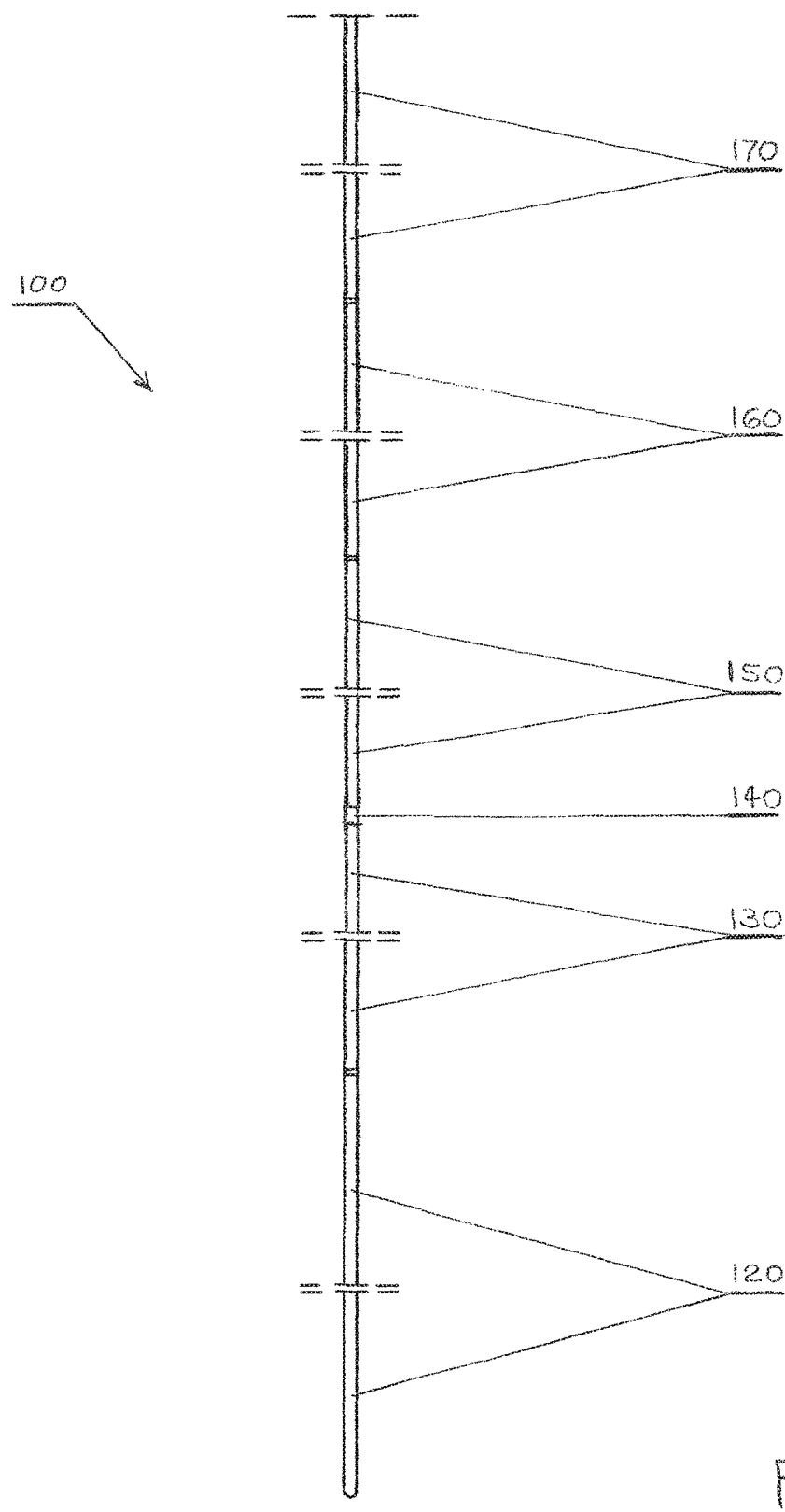
FIG. 1 is a cross sectional view of a self contained in-ground geothermal generator, with main segments in accordance with the invention.

Referring now to FIG. 1, the self contain in-ground geothermal generator comprises a slim cylindrical shape, which, positioned vertically, can be lowered with a system of cables deep into the ground in a pre-drilled well. The self contained in-ground geothermal generator 100 of the invention is shown in cross sectional view, with main segments. The main elements of the assembly 100 are: the boiler 120, the turbine compartment 130, the gear box, or converter 140, the electric generator 150, the condenser/distributor 160, and system of cables and tubes 170 which includes electric cable for transporting electric energy up to the ground surface.

Figure 2:
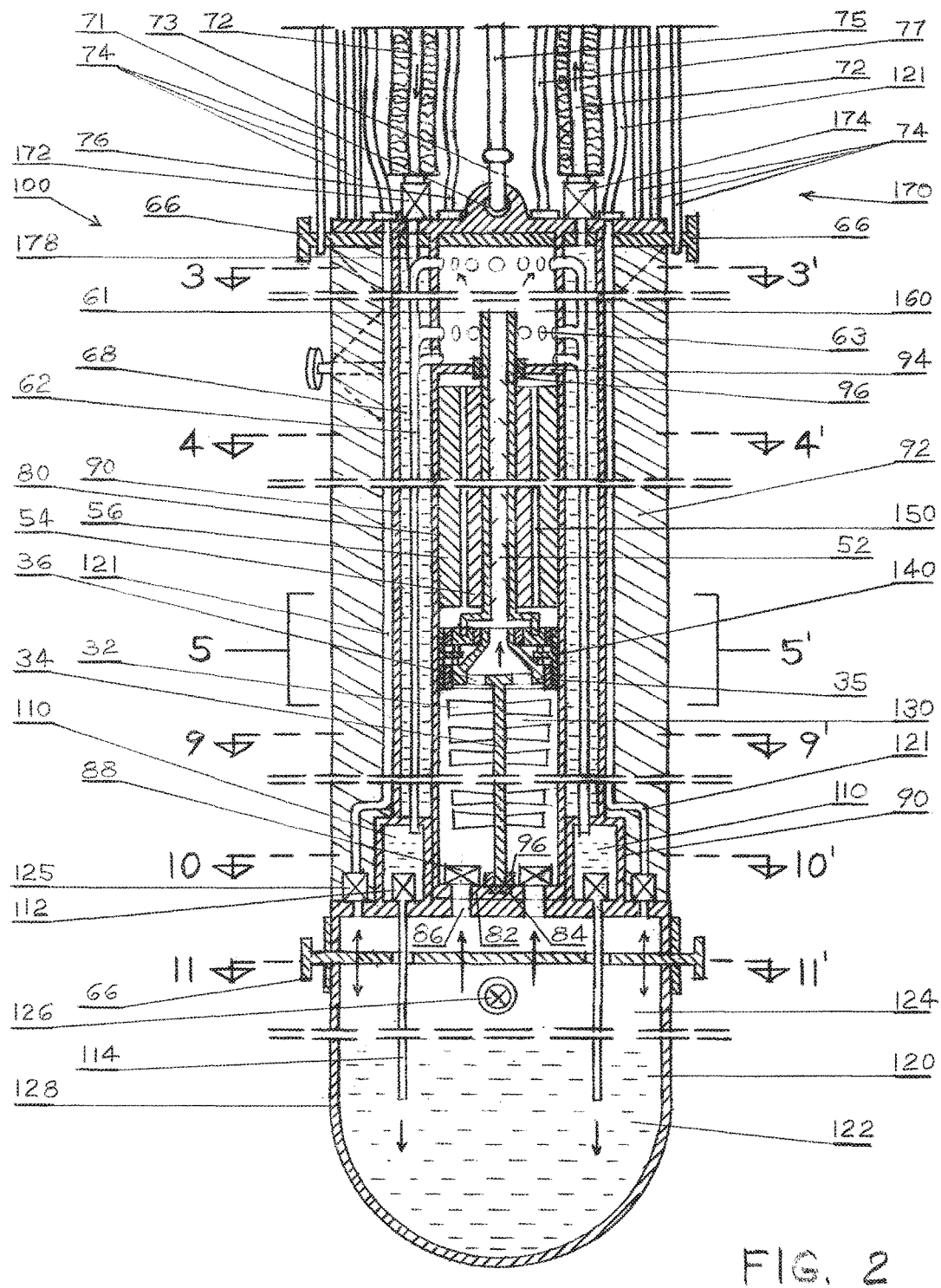
FIG. 2 is a cross sectional view taken along line 1-1' of FIG. 3 of a self contained in-ground geothermal generator, in accordance with the invention.
Figure 3:
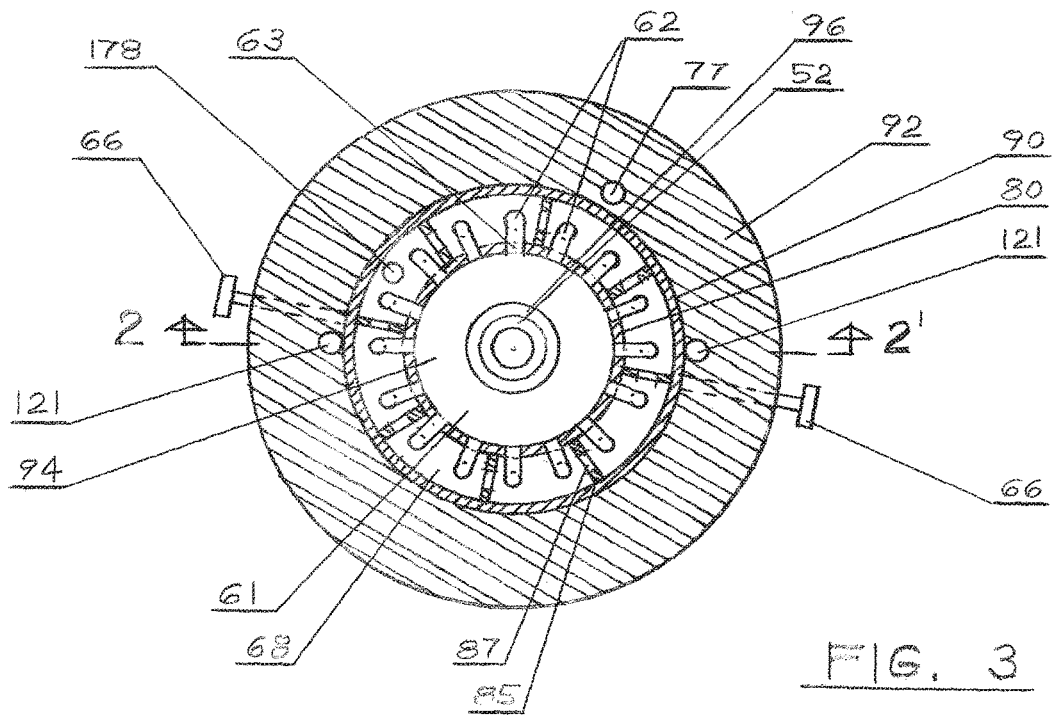
FIG. 3 is a cross sectional view of the condenser distributor along line 3-3' of FIG. 2, in accordance with the invention.

Referring now to FIG. 2, enlarged cross sectional view of the self contain in-ground geothermal generator 100 shown in FIG. 1, taken along line 2-2' of FIG. 3. The main elements of the assembly 100 are: the boiler 120, the turbine compartment 130, the gear box, or converter 140, the electric generator 150, the condenser 160 with distributor chamber 61 and peripheral chamber 68 with system of tubes 62 for returning exhausted condensed steam as a feed water back into the boiler, and system of cables and tubes 170.

The System of cables and tubes 170 includes peripheral caring cables 74, main caring cable 75, control cable 76, boiler supply tubes 121, cooling system tubes 72, and main electric cable 77, for transporting electric energy up to the ground surface.

The boiler 120 includes lower part having a water tank area 122 and upper part having a steam area 124. The assembly 100 has a hook eye 71 and can be attached by hook 73 and cable 75 or with system of pulleys and cables and then lowered into pre-drilled well deep in the ground to the level where rocks heated by magma deep below the Earth's surface boils the water in the water tank area 122 of the lower part of the boiler 120. The steam in the steam area 124 of the upper part of the boiler 120 is also heated by surrounding hot rocks producing superheated steam. High-pressured superheated steam passes through a set of steam control valve 88 into a turbines compartment 130, which has a set of blades 32 which are attached to a solid shaft 34 and spins it. The solid shaft 34 of the turbines is connected to a cylindrical shaft 52 of the electric generator 150 through a gear box or converter 140. Steam from the turbine compartment is stirred through a set of openings 36 and through the cylindrical shaft 52 of the generator 150 into the distributor chamber 61 of the condenser 160. Exhausted steam then starts condensing and is stirred through the set of openings 63 into a plurality of tubes 62 and back into the feed water tank 110 and then pumped into boiler 120 through boiler feed pump 112 and boiler feed pipe 114.

Here are also illustrated a structural external cylinder 90 and structural internal cylinder 80. The peripheral chamber 68 of the condenser 160 is formed in space between external cylinder 90 and internal cylinder 80. The peripheral chamber 68 has plurality of tubes 62 within, as explained above. There are structural ribs 85 between internal and external cylinders to improve structural integrity of the assembly in high pressure environment. The ribs 85 have holes 87 for water circulation. (For clarity and simplicity of the illustration the ribs 85 are not shown in FIGS. 1 and 2).

The cooling system is an independent close loop tube which has at least two heat exchangers; first one down in the well and second one on the ground surface. First one which absorbs heat from condenser by circulating cool water through the peripheral chamber of the condenser, formed between external and internal cylinders, and then transfers the heat up on ground surface through thermally insulated closed loop pipes where heat is exchanged through second heat exchanger, which is a coiled pipe, and then cooled water returned to the condenser again.

Figure 12:
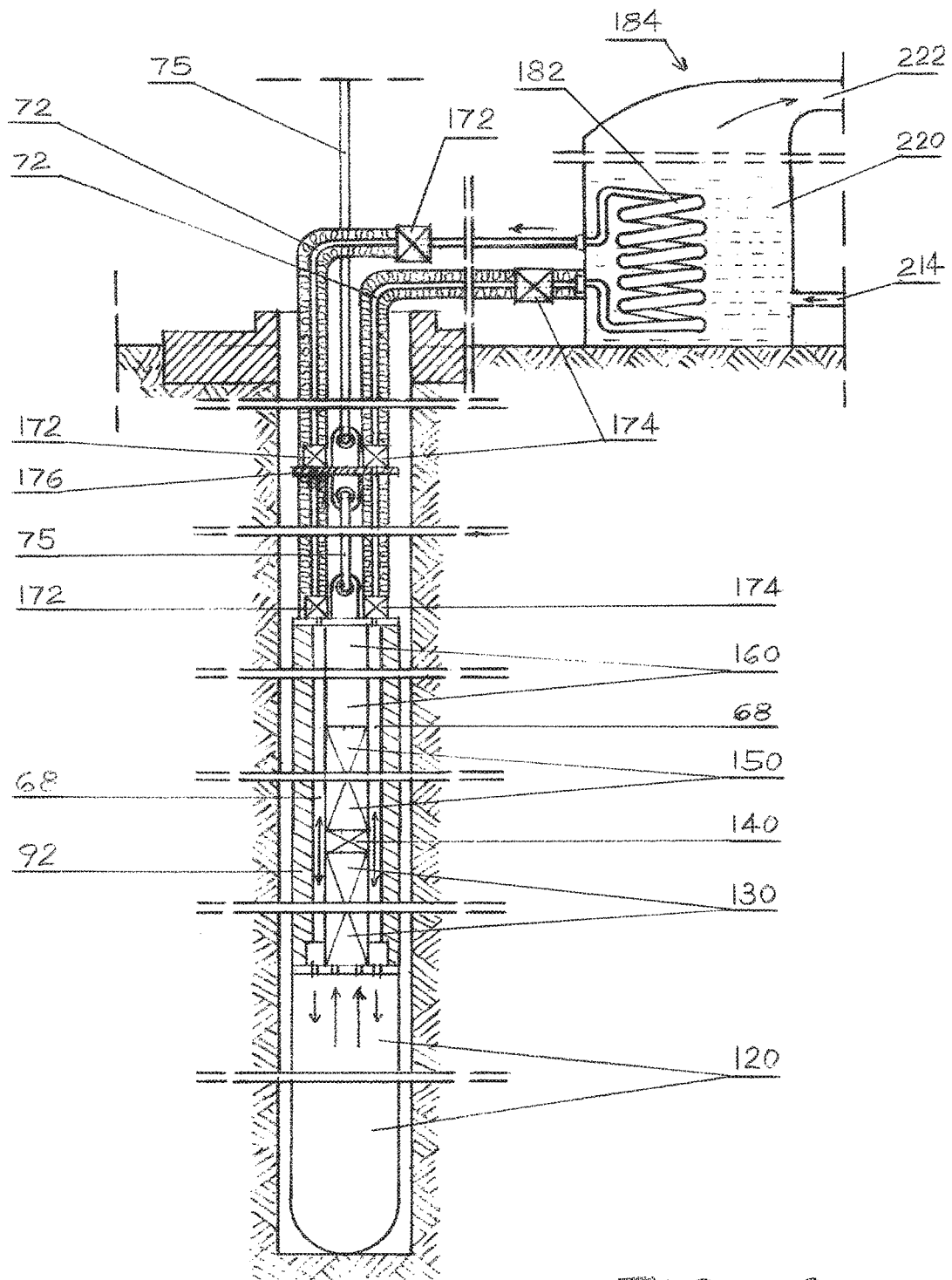
FIG. 12 is a schematic diagram of cross sectional view of the self contained in-ground geothermal generator, with main segments including heat exchanger on the ground surface, in accordance with the invention.

The cooling system consists of a close loop thermally insulated tube 72, one heat exchanger deep underground, which is peripheral chamber 68 of the condenser 160 and second one the coiled pipe 182 on the ground surface. (The coiled pipe 182 on the ground surface is shown in FIG. 12).

The close loop tube 72 is attached to the peripheral chamber 68 of the condenser 160 through cooling water pumps 172 and 174. The cooling water pump 172 injects cooled water through pipe 178 to the bottom of the peripheral chamber 68. Water cools condenser by circulating through the peripheral chamber 68 of the condenser 160. The hot water, which naturally rises to the upper part of the peripheral chamber 68, is then injected through water pump 174 into other end of the tube 72 and taken up to the ground surface where heat is exchanged through coil tube 182, which is part of heat exchanger 184, and then returns cooled water to peripheral chamber 68 of the condenser 160. The heat on ground surface is then used to produce additional electricity in a "binary" power plant through system of several heat exchangers (Explained in FIG. 12-19).

The peripheral chamber 68, which is part of the condenser 160, is strategically positioned so that besides cooling condenser 160, also surrounds, cools and prevent from overheating turbines 130, gear box/converter 140, and electromagnetic generator 150.

The close loop tube 72 have at least one water pump 172 in line (preferably several) to provide water circulation through the thermally insulated tube line and to reduce hydrostatic pressure at the lower part of the close loop system. If necessary several close loop tube 72 can be installed on unite to speed up cooling and heat exchange process. The ratio of speed and pressure inside closed loop line are constant. P (pressure)×V (speed)=constant. More speed=less pressure.

Figure 13:
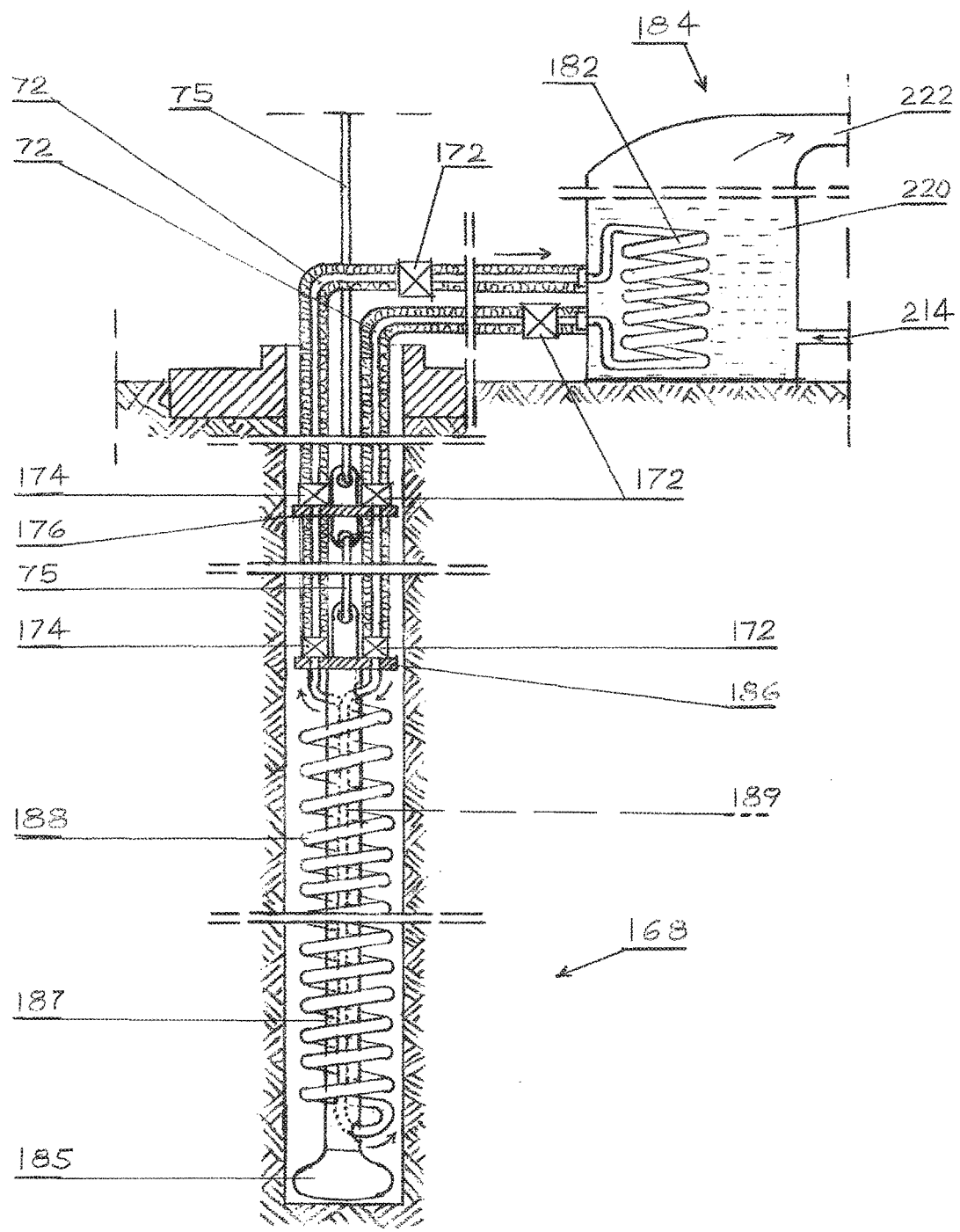
FIG. 13 is a schematic diagram of cross sectional view of an alternative independent heat exchange system, with main segments including a close loop line, one heat exchanger deep in the ground and one on the ground surface, in accordance with the invention.

As an alternative solution; the peripheral chamber 68 of the condenser 160 can be supplied and cooled with an additional independent coiled metal pipe (heat exchanger) and close loop system similar to one shown in FIG. 13.

The peripheral wall of the boiler 120 can have indentations to increase conductive surface and to increase conductivity of heat to the water inside boiler (For simplicity not shown).

The boiler 120 is filled with water, after whole assembly of the self contained in-ground geothermal generator 100 is lowered to the bottom of the well, through set of tubes 121, to reduce weight of assembly during lowering process. Illustrated are two tubes 121 attached to the unit—one to supply water into boiler 120 and other to let air escape during filling process. Also important purpose of the tubes 121 is to supply, maintain and regulate necessary level of water in boiler 120.

All main elements of the assembly 100; the boiler 120, the turbine compartment 130, the gear box, or converter 140, the electric generator 150, and the condenser/distributor 160, can be assembled during lowering process by fusing multi sections of same kind to the desired length and capacity. The fusing process can be bolting or welding.

There is a set of protruded holding pins 66 on each assembly segment so it can be carried with set of separate peripheral cables 74 to reduce tension on main cable 75 during lowering or lifting the assembly.

The condenser 68, which is formed between structural external 90 and structural internal 80 cylinders, which surrounds and cools whole unit, except boiler 120, is insulated from external heat of hot rocks with tick layer of heat resistant insulation 92.

The boiler 120 has a safety check valve 126 to release steam, if needed, in emergency such as if control valves malfunction, etc.

The purpose of the gear box or converter 140, which is located between turbines 130 and the electric generator 150, is to neutralize momentum produced by the spinning turbines 33 by changing the direction of the rotor 54 of the generator 150. Thus the rotor 54 of the generator 150 spins in the opposite direction than the main turbines 33. If needed, several gear boxes or converters 140 can be installed into generator compartment to neutralize or balance momentum produced by the spinning turbines and generators.

Referring now to FIG. 5-8, the upper end of turbines shaft 34 is solidly connected with disk/platform 35 which extend to the peripheral cylinder 41 of the gear box 140, with which is secured and engage with system of bearings 42 and gears wheels 43. Gear box is secured to the main structural cylinder 80. Disk/platform 35 has several openings 36 for steam to leave turbines compartment. Disk/platform 35 also extends upwardly in shape of funnel 39 for steam to be funneled into cylindrical shaft 52 of the electric generator 150. The cylindrical shaft 52 of the rotor 54 also functions as a secondary turbine. It has secondary set of small blades 58 attached to the inside wall and positioned so to increase rotation of the rotor when steam passes through.

Disk/platform 35 is engage with upper disc/platform 37 through set of gear wheels 43, which are secured with peripheral cylinder 41 of the gear box 140 with their axles/pins 44. The upper disk/platform 37 is also engage with upper part 38 of the funnel 39 through bearing 46 and with peripheral cylinder 41 of the gear box 140 through bearing 47 and is also solidly connected to cylindrical shaft 52 of the generator 150. Disk/platform 35 and disk/platform 37 have carved grooves 45 which engage and correspond with gear wheels 43.

FIG. 3, is a cross sectional view of the condenser/distributor 160 along line 3-3' of FIG. 2. FIG. 3 illustrates the main structural internal cylinder 80, the external structural cylinder 90, the condenser/distributor 61, and the peripheral chamber 68 of the condenser 160 which surrounds the condenser/distributor 61. Here are also shown tubes 62 spread around the peripheral chamber 68. Exhausted steam passes through openings 63 which lead to tubes 62 which then return condensed water to the boiler 120. Here is also shown solid disk/platform 94 which separate generator 150 from condenser 160. Upper end of cylindrical shaft 52 is secured and engaged to the disk/platform 94 through bearing 96.

Here is also shown pipe 178 which brings cooled water at the bottom of the peripheral chamber 68. Also shown here are boiler supply tubes 121 for filling boiler with water after assembly is lowered down into well. Also shown here are structural ribs 85 between internal and external cylinders to improve structural integrity of the assembly in high pressure environment. Here are also shown protruded holding pins 66 for caring each segment of the assembly with set of peripheral cables 74 to reduce tension on main cable 75 during lowering or lifting the assembly. (Caring cables not shown).

Here is also shown electrical conduit 77 which transport electricity from generator 150 up to the ground surface and further to the power lines. Also shown here is heat resistant insulation 92 which surrounds whole assembly except boiler 120.

Figure 4:
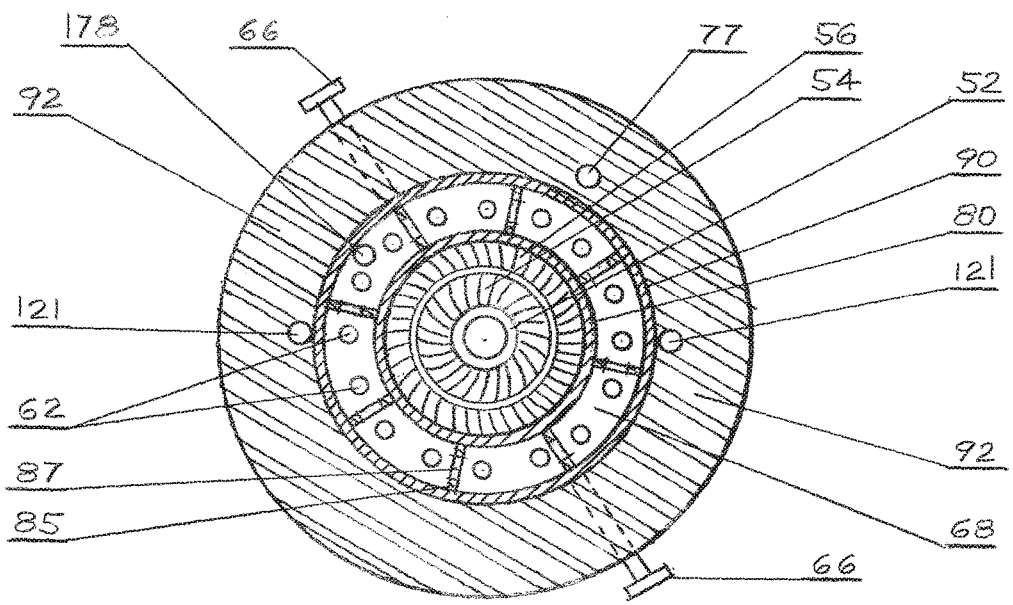
FIG. 4 is a cross sectional view of the condenser and generator along line 4-4' of FIG. 2, in accordance with the invention.
Figure 5:
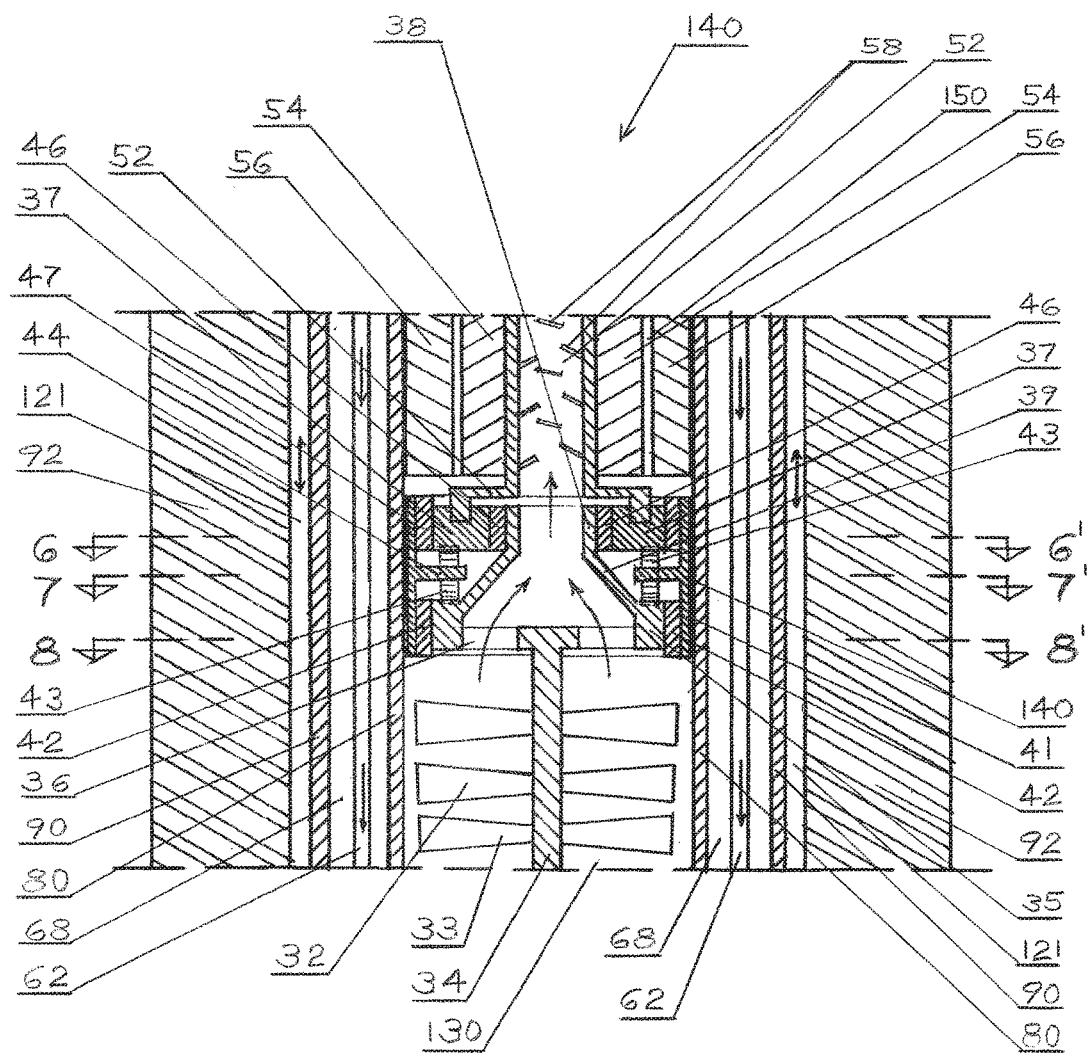
FIG. 5 is an enlarged cross sectional view along line 5-5' of FIG. 2 illustrating the condenser and the gear box, in accordance with the invention.
Figure 6:
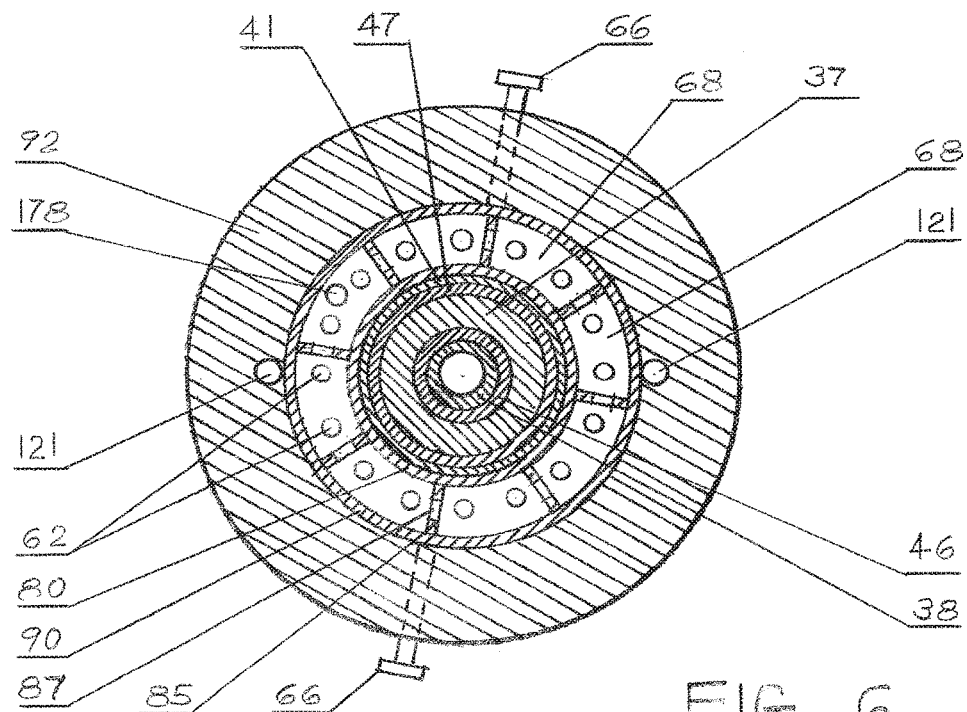
FIG. 6 is cross sectional view along line 6-6' of FIG. 5, in accordance with the invention.
Figure 7:
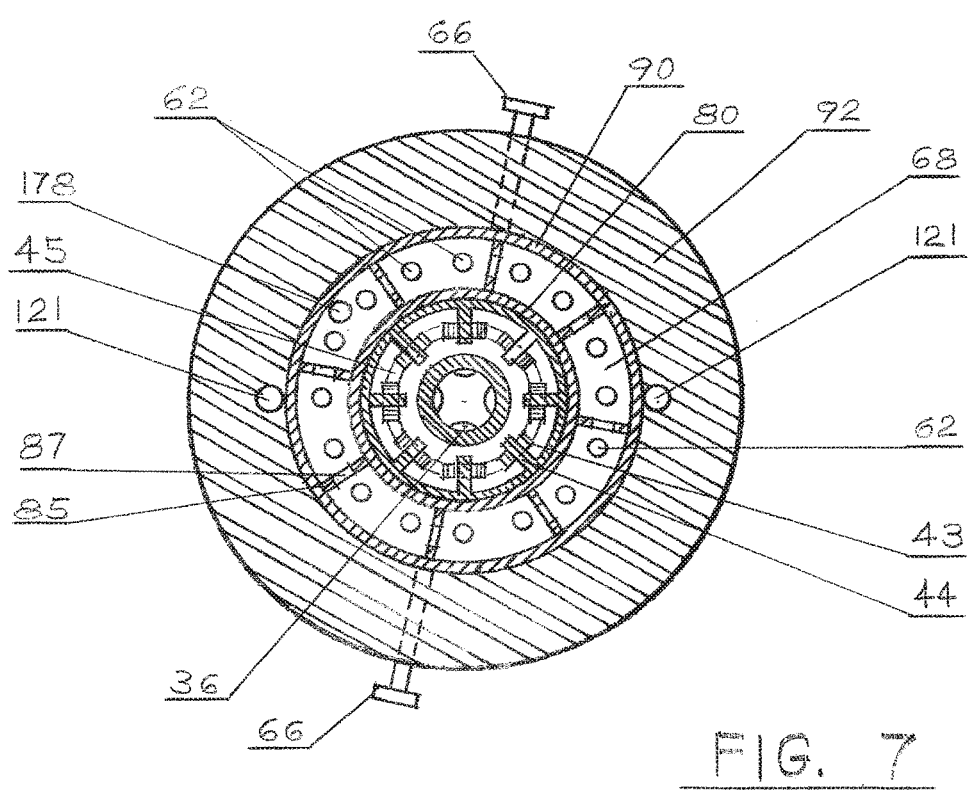
FIG. 7 is cross sectional view along line 7-7' of FIG. 5, in accordance with the invention.
Figure 8:
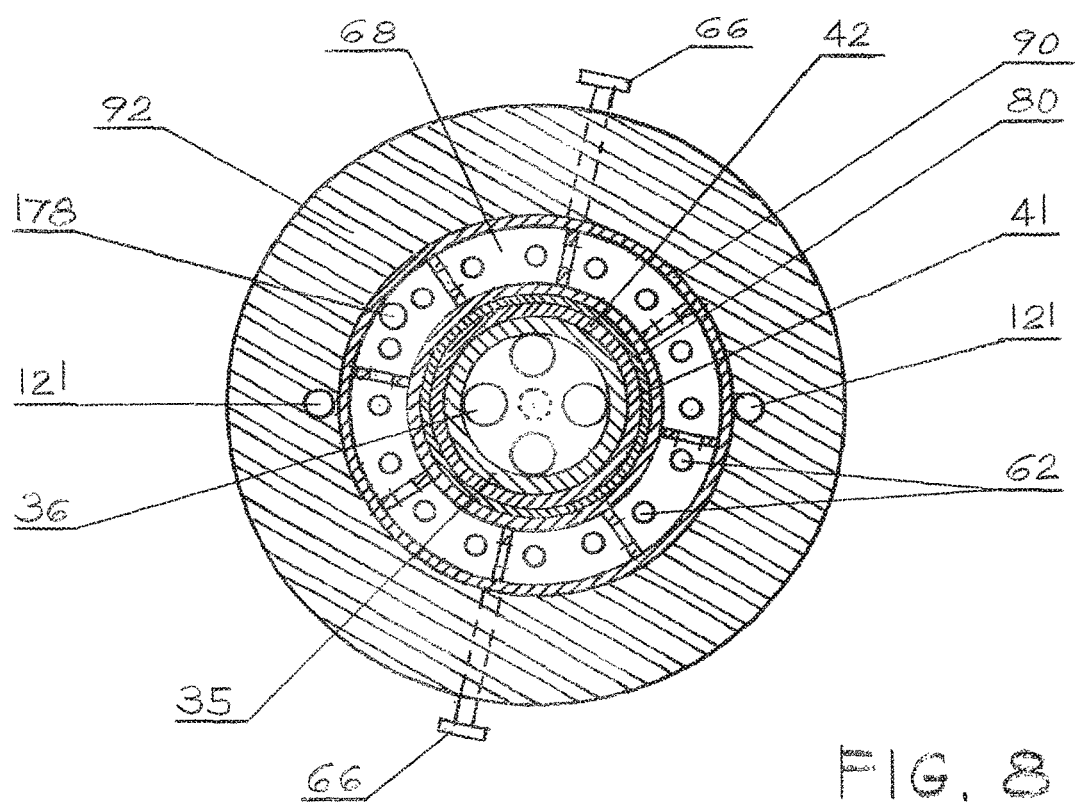
FIG. 8 is cross sectional view along line 8-8' of FIG. 5, in accordance with the invention.

FIG. 4, is a cross sectional view of the electric generator 150 along line 4-4' of FIG. 2. FIG. 4 also illustrate main structural internal cylinder 80, external structural cylinder 90, the peripheral chamber 68 of the condenser 160 with tubes 62 spread around the peripheral chamber 68. Here is also illustrated cylindrical shaft 52, rotor 54 of the electric generator 150 which is fix to the shaft 52, and stator 56 of the electric generator 150 which is fix to the main internal structural cylinder 80. Here are also shown protruded holding pins 66 for caring each segment, but offset relative to adjacent segment so that peripheral cables 74 can be spread all around periphery of the assembly. Also shown here are structural ribs 85 with perforations 87, the electrical conduit 77, boiler supply tubes 121, the pipe 178 and insulation 92.

Figure 9:
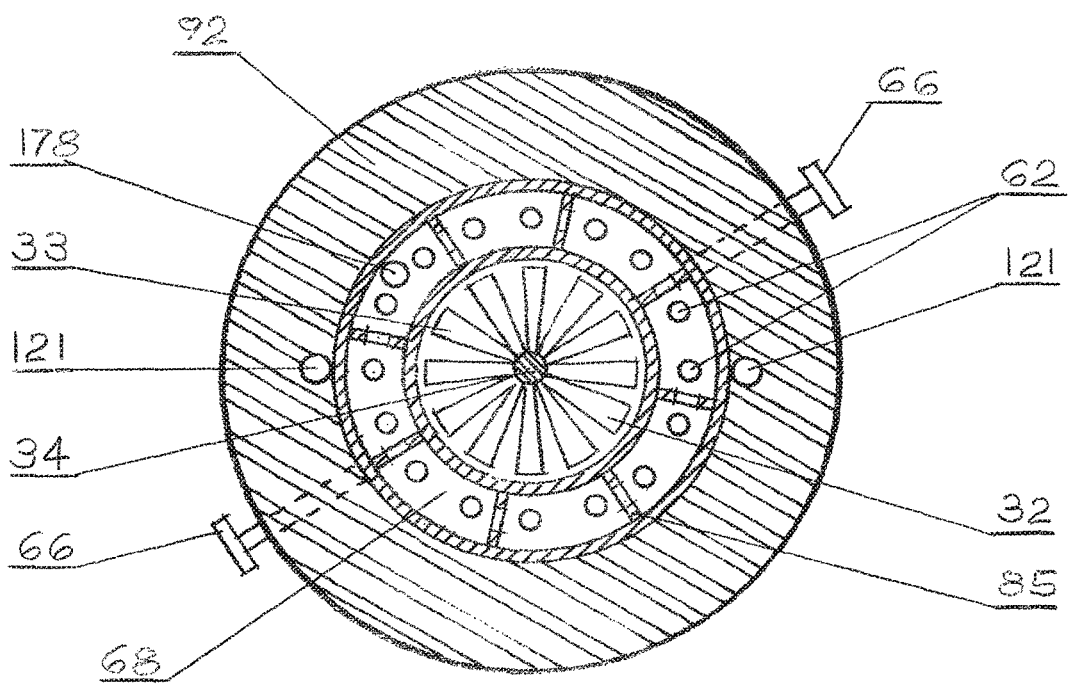
FIG. 9 is cross sectional view of the condenser and the turbines along line 9-9' of FIG. 2, in accordance with the invention.

FIG. 9 is cross sectional view of the condenser and the turbines along line 9-9' of FIG. 2.

FIG. 9 also illustrate main structural internal cylinder 80, external structural cylinder 90, the peripheral chamber 68 of the condenser 160 with tubes 62 spread around the peripheral chamber 68. Also shown here are structural ribs 85 with perforations 87.

Here are also illustrated solid turbines shaft 34 with blades 32, boiler supply tubes 121, the pipe 178, and insulation 92. Here are also shown protruded holding pins 66 for caring each segment, but offset relative to adjacent segment.

Figure 10:
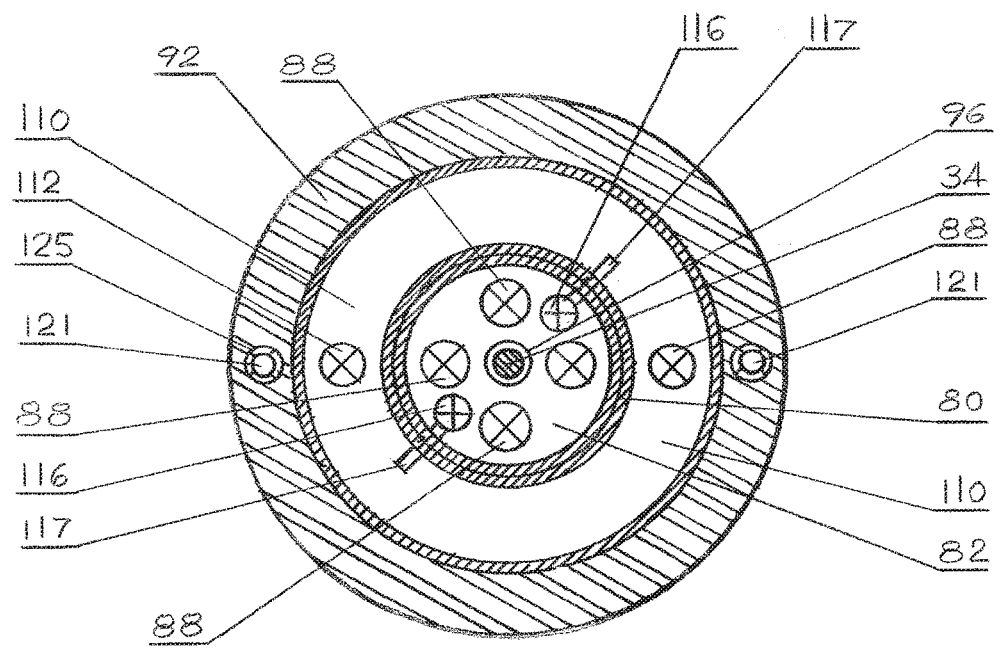
FIG. 10 is cross sectional view of the feed water storage tank and turbines along line 10-10' of FIG. 2, in accordance with the invention.

FIG. 10 is cross sectional view of the feed water storage tank and turbines along line 10-10' of FIG. 2. FIG. 10 also illustrate main structural internal cylinder 80 and extended external structural cylinder 90 which, at this location, forms the feed water storage tank 110. Here are also shown the boiler feed pumps 112 located in the feed water storage tank 110 which inject feed water into boiler 120. Also shown here are steam control valves 88 which controls flow of steam into turbines 33. Here are also shown water pumps 116 located on the disc/platform 82 at the bottom of the turbines compartment 130. The purpose of water pumps 116 is to removes excess water, if accumulated at the bottom of turbines compartment 130, and to eject it into feed water storage tank 110 through pipes 117. (For clarity and simplicity the pumps 116 are not shown in FIG. 2). Also shown here are water pumps/valves 125 and tube 121 which supply, maintain and regulate necessary level of water in boiler 120. Here is also shown the solid shaft 34 of the turbines 33 with set of bearings 84 and 96 on which the shaft 34 sits and is secured on the disc/platform 82. Also shown is the insulation 92.

Figure 11:
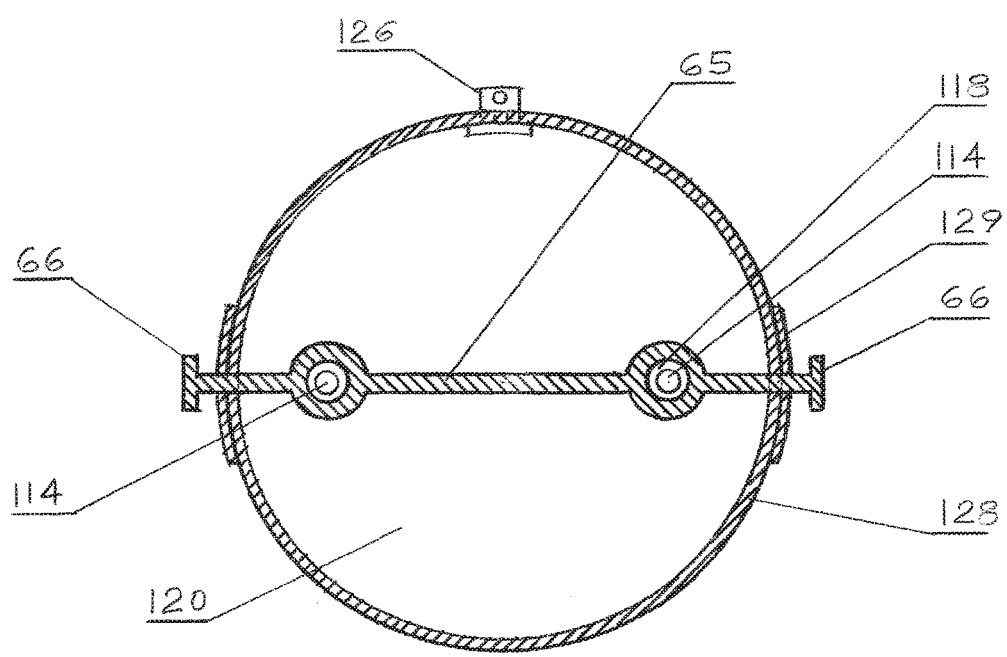
FIG. 11 is cross sectional view of the boiler along line 11-11' of FIG. 2, in accordance with the invention.

FIG. 11 is cross sectional view of the boiler 120 along line 11-11' of FIG. 2. Here is illustrated peripheral wall/cylinder 128 of the boiler 120. Also shown here are protruded holding pins 66 for caring each segment of the assembly with set of peripheral cables as explained earlier. Here holding pins 66 are shown as extensions of the rod 65. The rod 65 has openings 118 for guiding feed pipe 114 to the lower part 122 of the boiler 120.

Also here is shown safety release valve 126 and reinforcing plates 129.

FIG. 12 is a schematic diagram of cross sectional view of the self contained in-ground geothermal generator, with main segments including heat exchanger on the ground surface. The self contained in-ground geothermal generator (SCI-GGG) uses three closed loop systems. The first closed loop system circulates working fluid through boiler, turbine, generator, condenser and back through boiler. The second closed loop system (self contained heat exchanger) circulates fluid through condenser, thermally insulated pipes and coil coupled to binary power unit on the ground surface. The self contained heat exchanger (SCHE) is integral part of the SCI-GGG apparatus and can be used separately as an independent heat exchanger. The third closed loop system circulates working fluid through binary power unit on the ground surface and produces additional electricity. FIG. 12 illustrates the boiler 120, the turbines 130, the gear box 140, the electric generator 150, and the condenser 160. Here is also shown peripheral chamber 68 of the condenser 160 which function as a heat exchanger by cooling tubes 62 which are spread within. (For simplicity and clarity tubes 62 are not shown here). Here is also shown coil tube 182 which exchanges heat in a heat exchanger 184 up on the ground surface, which is part of the binary geothermal power plant 180, which is explained in FIG. 14. The peripheral chamber 68 of the condenser 160, which function as a heat exchanger down in the unite and coiled pipe 182, which exchanges heat in a heat exchanger 184 up on the ground surface are connected with close loop tubes 72 which are thermally insulated to prevent lousing heat during fluid transport between heat exchangers. Here are also illustrated several water pumps 172 and 174 which circulate water through close loop system. An alternative in-line pump is later explained and illustrated in FIGS. 22 and 23. Also here is shown cable connector platform 176 which connects segments of tubes and cables. Also here is shown main cable 75, and insulation layer 92.

FIG. 13 is a schematic diagram of cross sectional view of an alternative, independent, self contained heat exchange system. The self contained heat exchanger (SCHE) apparatus is integral part of the self contained in-ground geothermal generator (SCI-GGG) apparatus (illustrated in FIG. 12) and is used separately as an independent heat exchanger. Here in FIG. 13 is illustrated the self contained heat exchanger (SCHE) apparatus with two closed loop systems. The main segments of first closed loop system include; a close loop tube, first heat exchanger 168 deep in the ground at heat source and second heat exchanger 182 up on the ground surface which is part of the second closed loop system which is binary power unit 184. The second closed loop system circulates working fluid through binary power unit on the ground surface and produces additional electricity. The main segments of second closed loop system include; a boiler, a turbine, a generator and condenser (illustrated in FIG. 14). Here in FIG. 13 are illustrated the same elements of the cooling system shown in FIG. 12, namely; one heat exchanger deep in the ground at heat source and one up on the ground surface and one close loop thermally insulated tube with several in-line water pumps which circulates water through close loop system.

In this embodiment, instead of peripheral chamber 68 which functions as a heat exchanger, a coiled pipe 188 is used which functions as a first heat exchanger 168. The heat exchanger 168 consists of; the strait pipe 189, the coiled pipe 188, the structural pipe 187 and the platform 186. The structural pipe 187 which provide strength to the unit is attached to the platform 186. The structural pipe 187 has one opening at the bottom for strait pipe 189 to exit and one opening at top for strait tube 189 to enter. The structural pipe 187, which prevent coiled pipe 188 from collapsing from its weight, may have more perforations if necessary to reduce its weight and to provide more heat to the strait pipe 189. The spacers which keeps distance between coils in coiled pipe 188 and structural pipe 187 are not illustrated. Here is also shown base 185 of structural pipe 187 on which whole assembly rest. Alternatively, structural pipe 187 can be adapted to perform the function of the strait pipe 189.

The coiled pipe 188 which functions as first heat exchanger 168 down in the ground and coiled pipe 182 which functions as second heat exchanger 184 up on the ground surface are connected with close loop tube 72. Here are also illustrated several in-line water pumps 172 and 174 which circulate water through close loop system. The heat from hot rocks deep in the well is absorbed through first heat exchanger 168 and transported with thermally insulated pipe 72 up to the ground surface to the second heat exchanger 184 where its heat is transferred into a binary power unit which uses working fluids, such as isopentane, that boils at a lower temperature than water. The heat exchanger 184 is part of the binary geothermal power plant 180, which is explained in FIG. 14.

Also here is shown cable connector platform 176 which connects segments of tubes 72 and cable 75. Connector platform 176 or a plurality of platforms 176 may also function as a barrier(s) or a plug(s) to reduce the amount of heat escaping from the well bore.

The heat exchange system explained here in FIG. 13. is an alternative cooling system for a self-contained in-ground geothermal generator can also function as an alternative, independent, heat exchange system, which would be substantial improvement to experimental process so called "hot dry rock technology".

The simplest "hot dry rock technology" power plant comprises one injection well and two production wells. Scientist are trying to drill down injection well into the rocks and then inject down into well, under pressure, what ever water source they have happen to have on the surface hoping that water will travel through cracks and fissures of the hot rocks and form underground reservoir, and then they intend to drill production wells around perimeter and try to recover that water and steam by pumping it back to surface and then use it in a conventional or in a "binary" power plant.

Binary plants use lower-temperature, but much more common, hot water resources (100° F.-300° F.). The hot water is passed through a heat exchanger in conjunction with a secondary (hence, "binary plant") fluid with a lower boiling point (usually a hydrocarbon such as isobutane or isopentane). The secondary fluid vaporizes, which turns the turbines, which drive the generators. The remaining secondary fluid is simply recycled through the heat exchanger. The geothermal fluid is condensed and returned to the reservoir.

It remains to be seen if presently experimental "hot dry rock technology" can function as expected and answer special challenges:
1. It requires a huge amount of water to form, deep down, man made, hydrothermal reservoir in a place where water has not been naturally accumulated.
2. Would a huge amount of water be lost, absorbed into rocks in different directions?
3. How much of water, if any, could reach production well through cracks and fissures in the hot rocks?
4. How mach water, if any can be recovered and pumped back on ground surface to be used in a conventional or in a "binary" power plant?
5. Also, during pumping up water to the surface through production well water will pass through layers of gradually less hot rocks and eventually through cold rocks close to the surface—how much of the heat will be lost and how much of water will be lost—absorbed into rocks during trip up?
6. There is strong indications that experimental Enhanced Geothermal System (EGS) can induce seismicity because injected water can find underground pockets (caves) and with high pressure and temperature can induce explosion.

The heat exchange system explained here in FIG. 13 is a simple system which uses the same amount of water all the time because it is literally close loop system, not just binary part on the ground surface but also part down in the ground. It doesn't deal with removing silica and minerals in a separator from the geothermal fluid.

It doesn't lose water into cracks and fissures of the hot rocks because water circulates through coiled pipe and houses. The lost of heat on the trip up is limited because pipes are thermally insolated. It doesn't require several wells to function (injection well and several production wells) it rather uses single well for each unit. The heat exchange system explained herein in FIG. 13 as well the apparatus explained in FIG. 12 can operate, not just in dry hot rocks areas but also, in areas with hydrothermal reservoirs and many other applications including cooling dysfunctional nuclear reactors or in reverse process warming surroundings if needed.

Figure 14:
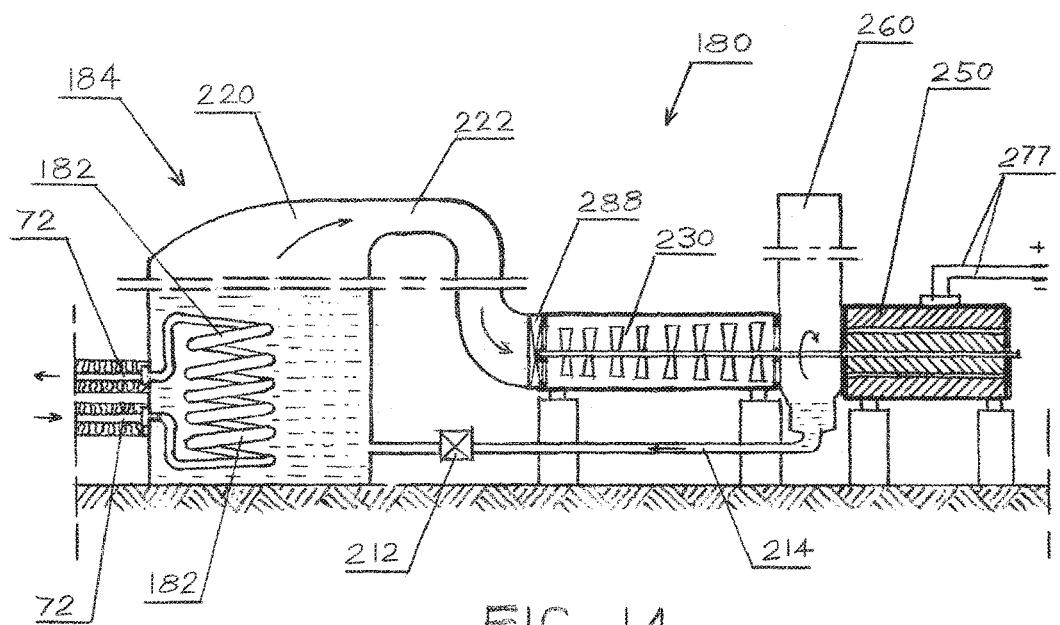
FIG. 14 is a schematic diagram of cross sectional view of the binary geothermal power plant on the ground surface, in accordance with the invention.

FIG. 14 is a schematic diagram of cross sectional view of the binary geothermal power plant 180. Here are illustrated; the heat exchanger 184, the turbines 230, the condenser 260 and electric generator 250. Hot water from deep underground passes through close loop tube 72 into coil 182 inside heat exchanger 184 where its heat is transferred into a second (binary) liquid, such as isopentane, that boils at a lower temperature than water. When heated, the binary liquid flashes to vapor, which, like steam, expands across, passes through steam pipe 222 and control valve 288 and then spins the turbine 230. Exhausted vapor is then condensed to a liquid in the condenser 260 and then is pumped back into boiler 220 through feed pipe 214 and boiler feed pump 212. In this closed loop cycle, vapor is reused repeatedly and there are no emissions to the air. The shaft of the turbines 230 is connected with shaft of the electric generator 250 which spins and produces electricity, which is then transported through electric cable 277 to transformer and grid line to the users. (Transformer and grid line are not illustrated). The binary power unit 180 can be produced as portable unit on wheels (on chase of truck 18 wheeler).

Figure 15:
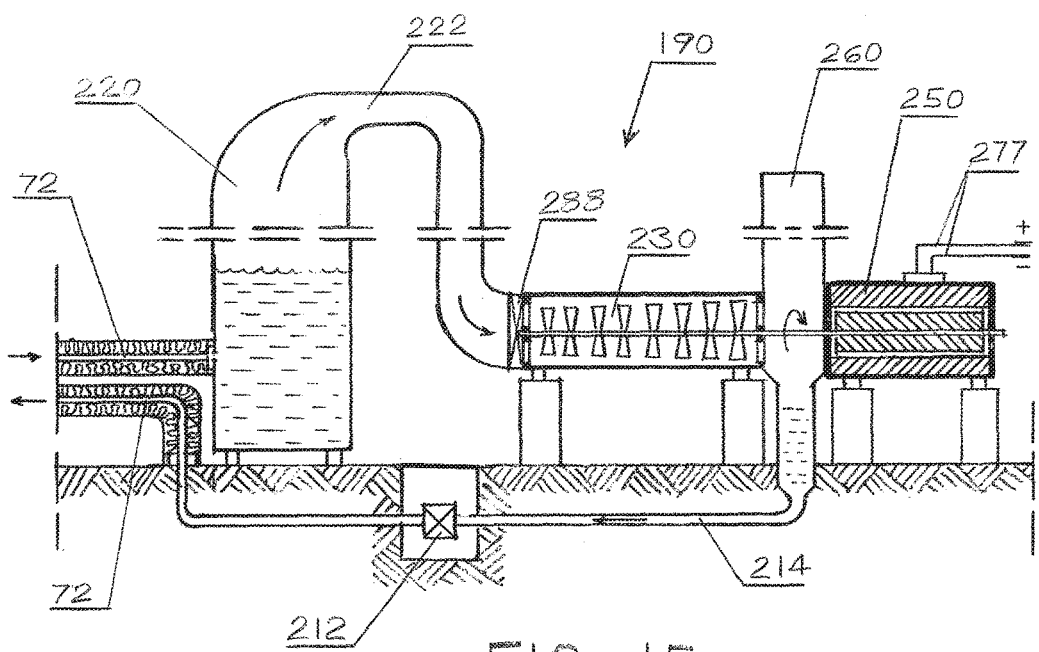
FIG. 15 is a schematic diagram of cross sectional view of an alternative geothermal power plant on the ground surface, in accordance with the invention.

FIG. 15 is a schematic diagram of cross sectional view of a geothermal power plant 190 (not a binary power plant), as an alternative solution for cases where water coming from tube 72 is hot enough to produce steam. (It may be applicable in an alternative, independent, heat exchange system shown in FIG. 13). Here are illustrated; the boiler 220, the turbines 230, the condenser 260 and electric generator 250. Hot water from deep underground passes through close loop tube 72 into boiler 220 where evaporates. The steam then passes through steam pipe 222 and control valve 288 and then spins the turbine 230. Exhausted vapor is then condensed to a liquid in the condenser 260, which can be air or water cooled, and then is pumped back into close loop tube 72 which leads into well as explain earlier. Here is also shown feed pipe 214 and water pump 212 which are part of close loop system. Here is also shown shaft of the turbines 230 which is connected with shaft of the electric generator 250 which spins and produces electricity. Electricity is then transported through electric cable 277 to transformer and grid line to the users. (Transformer and grid line are not illustrated).

Figure 16:
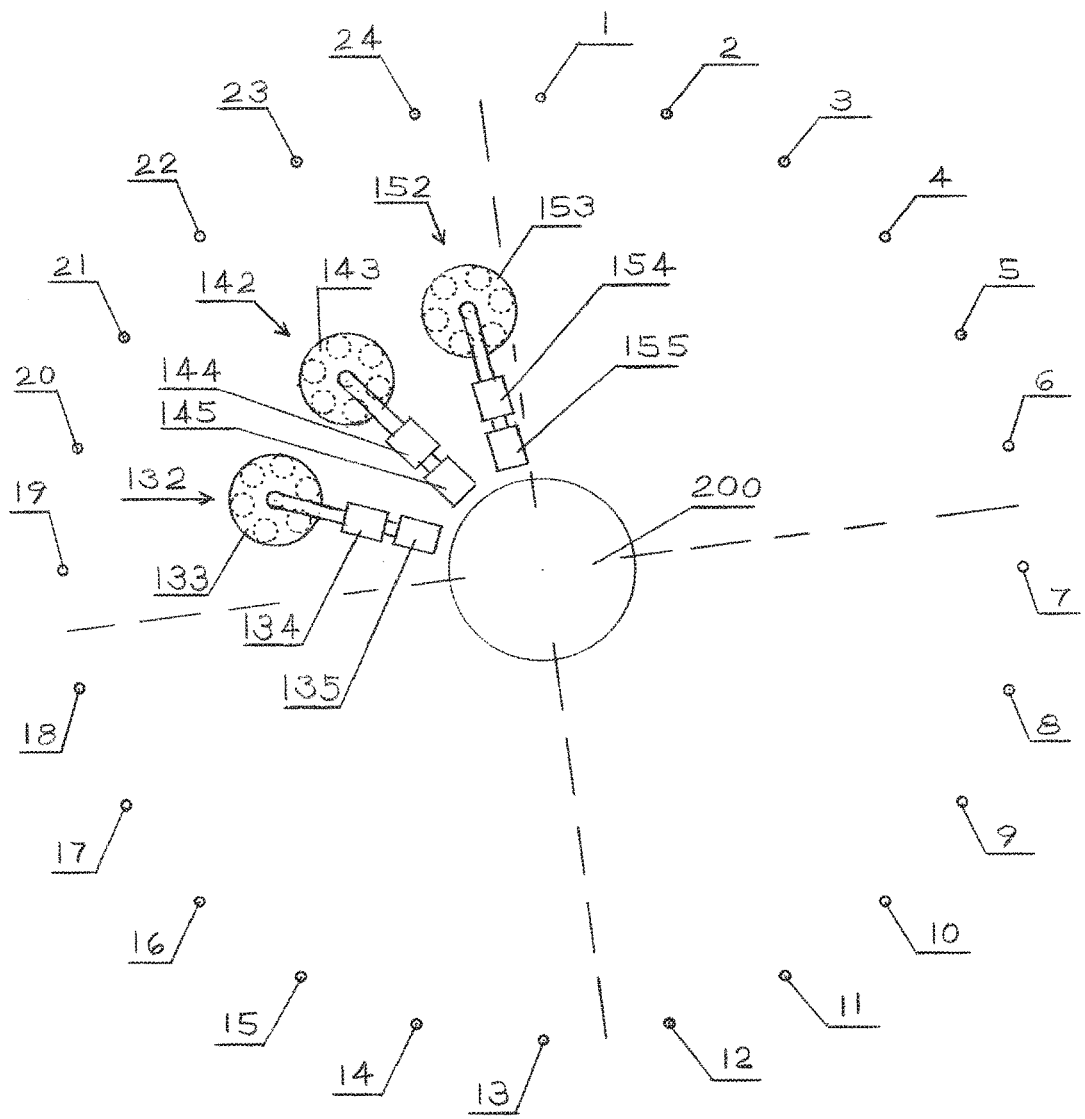
FIG. 16 is plain view of the geothermal power plant with 24 wells and control center. For clarity and simplicity, is shown schematic diagram only of one quarter of the plant (6 wells), in accordance with the invention.
Figure 17:
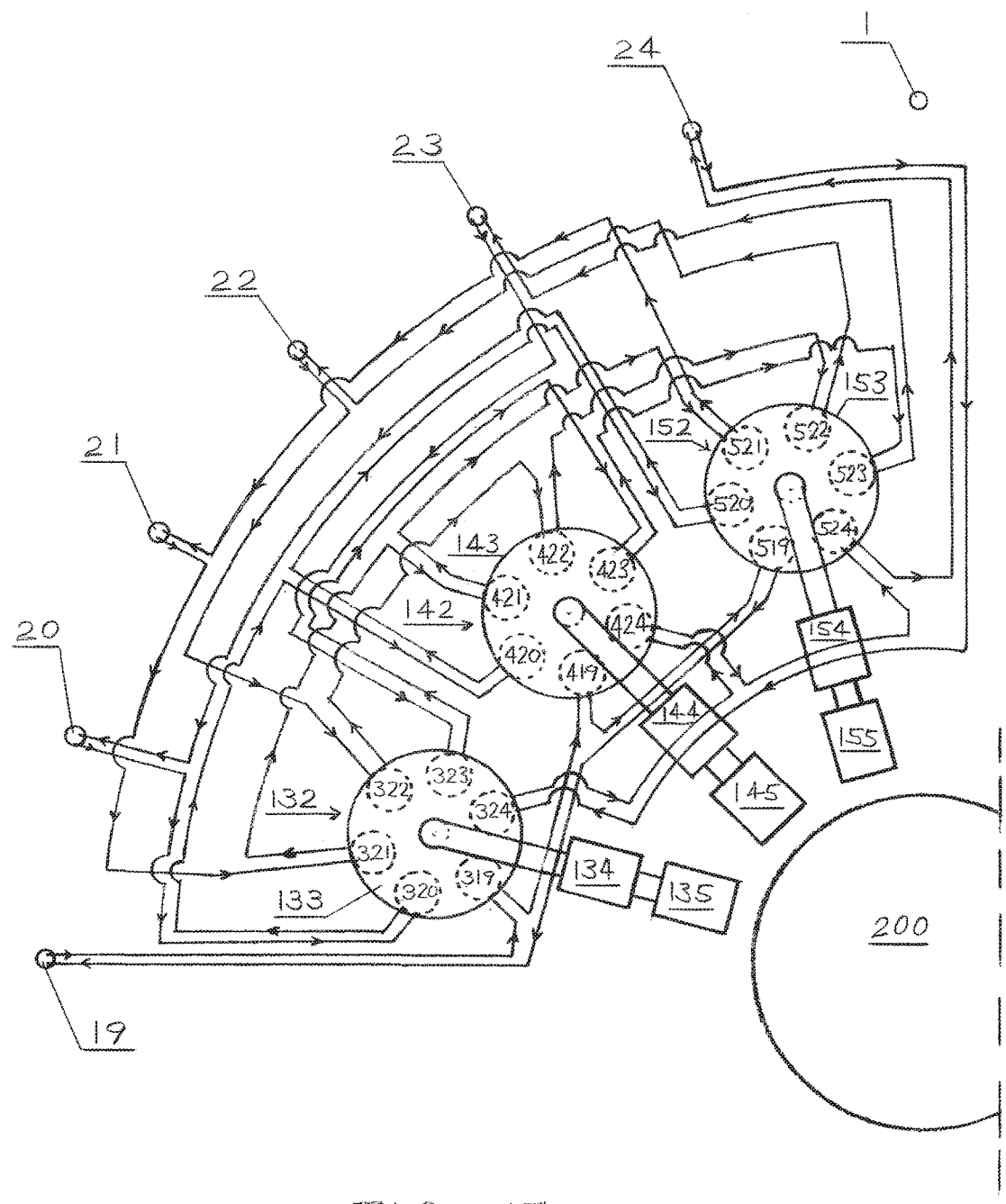
FIG. 17 is enlarged schematic diagram of the one section of the geothermal power plant shown in FIG. 16 in accordance with the invention.

FIGS. 16 and 17 illustrate plain view of the geothermal power plant 300 with 24 wells and control center 200 in accordance with the invention. For clarity and simplicity, here is shown schematic diagram only of one quarter of the plant, 6 wells 19-24, and three binary power units 132, 142 and 152. The other three quarters of the power plant are identical.

As explained earlier the cooling system of the self contained in-ground geothermal generator 100, is a close loop tube system which cools condenser by circulating water through the peripheral chamber 68 of the condenser 160, formed between external and internal cylinders 90 and 80, and then transfers the heat up on ground surface. The heat on the ground surface is then used to produce additional electricity in a "binary" power plant through system of several heat exchangers and then returned as cooled water to the relevant peripheral chamber 68 of the condenser 160.

Here are illustrated three "binary" power units 132, 142 and 152 which are connected with six self contained in-ground geothermal generators inside wells 19-24.

Each of those three binary power units 132, 142 and 152 consist of: the boilers 133, 143 and 153, the turbines 134, 144 and 154 and the electric generators 135, 145 and 155.

The boiler 133 of the binary production unit 132 has six heat exchange coils 319, 320, 321, 322, 323 and 324, which are connected to the condensers 160 of the relevant self contained in-ground geothermal generators, inside wells 19, 20, 21, 22, 23 and 24 with one end of the tube of close loop system.

Before other end of the tube of close loop system reaches the condensers 160 of the relevant self contained in-ground geothermal generators inside wells 19, 20, 21, 22, 23 and 24 and complete close loop cycle, it also passes through boilers 143 and 153 of the binary production units 142 and 152. The purpose of it is to exchange heat and use it on the ground surface in the binary production units as much as possible and to send back cooled water to the condensers 160. For clarity and simplicity, any radiant tubing is not shown and directions of the flow through line are marked with arrow sign.

The boiler 143 of the binary production unit 142 has also six heat exchange coils 419, 420, 421, 422, 423 and 424.

The boiler 153 of the binary production unit 152 has also six heat exchange coils 519, 520, 521, 522, 523 and 524.

The boiler 133 of the binary production unit 132 produces the hottest steam because it is the first station where heat is exchanged through coils 319, 320, 321, 322, 323 and 324.

The boiler 143 of the binary production unit 142 is the second station where heat is exchanged through coils 419, 420, 421, 422, 423 and 424, and steam temperature is lesser than in boiler 133.

The boiler 153 of the binary production unit 152 is the third station where heat is exchanged through coils 519, 520, 521, 522, 523 and 524, and steam temperature is lesser than in boiler 143.

The binary power units 132, 142 and 152 are designed to operate at different steam temperature and presser.

As an alternative solution; the steam from boilers 133, 143 and 153, which deal with different temperature and pressure, can be funneled to a single binary power unit with single turbine and generator.

As an alternative solution; after leaving coils 519, 520, 521, 522, 523 and 524 of the binary production unit 152, if water is still hot, the tube 72 can be cooled with running water, if available, or can be used for heating building.

FIG. 17 is enlarged schematic diagram of the one section of the geothermal power plant 300 shown in FIG. 16.

Figure 18:
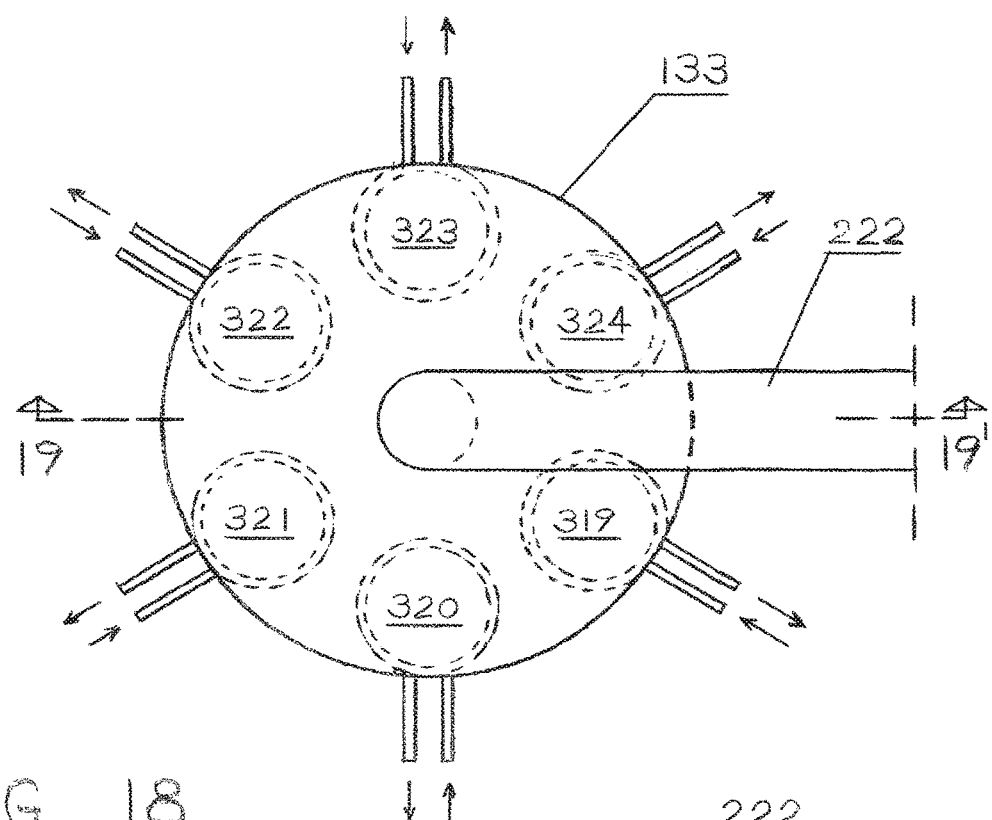
FIG. 18 is enlarged plain view of one heat exchanger tank illustrated in FIGS. 16 and 17, in accordance with the invention.

FIG. 18 is enlarged plain view of the boiler 133 of the binary production unit 132 illustrated in FIGS. 16 and 17. Here are shown heat exchange coils 319, 320, 321, 322, 323, 324 and main steam pipe 222.

Figure 19:
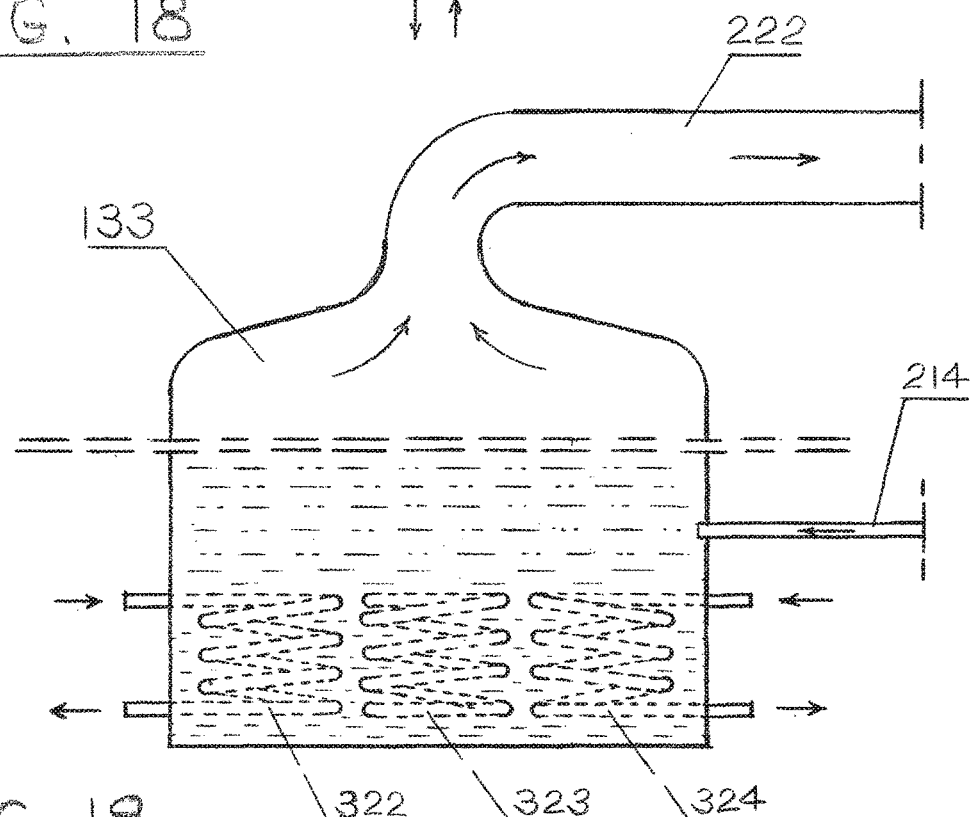
FIG. 19 is an enlarged cross sectional view of the heat exchanger tank taken along line 19-19' of FIG. 18, in accordance with the invention.

FIG. 19 is an enlarged cross sectional view of the boiler 133 of the binary production unit 132 taken along line 19-19' of FIG. 18. Here are also shown heat exchange coils 322, 323, and 324 from which its heat is transferred into a second (binary) liquid, such as isopentane, that boils at a lower temperature than water. When heated, the binary liquid flashes to vapor, which, like steam, expands across, passes through steam pipe 222. (The process is explained in binary power plant earlier in FIG. 14). Here is also shown feed pipe 214 through which exhausted vapor are returned into boiler 133 for reheating.

Figure 20:
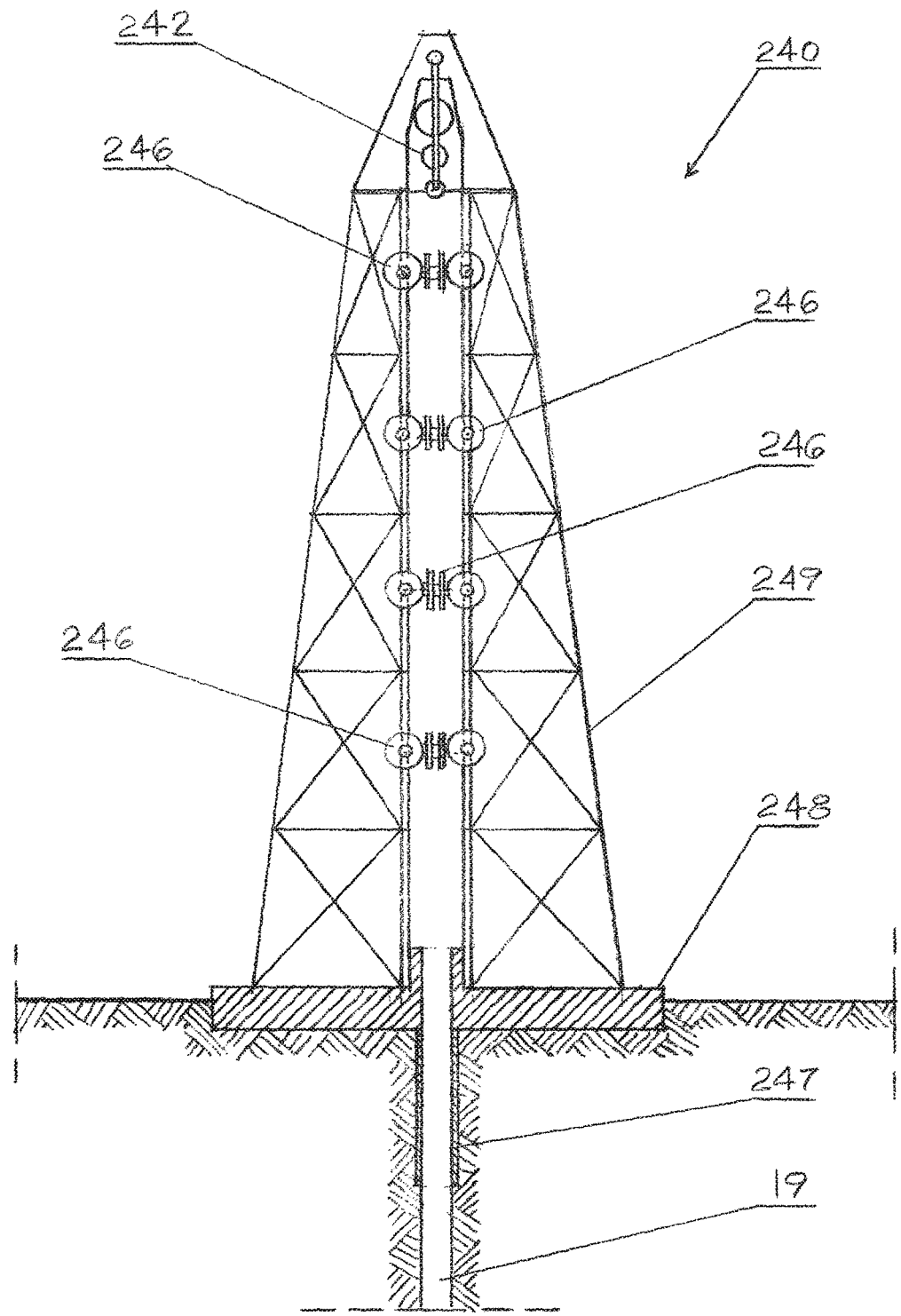
FIG. 20 illustrate a cross sectional view of an alternative tower for assembling, lowering or lifting the self contained in-ground geothermal generator, in accordance with the invention.

FIG. 20 illustrate a cross sectional view of an alternative tower 240 for assembling, lowering or lifting the self contained in-ground geothermal generator 100. Here are shown structural frame 249 of the tower 240. Also shown here are well 19, lining of the well 247, foundation platform 248, and system of ratchets 242 and 246 for main cable 75 and peripheral cables 74. (Cables are not shown).

Figure 21:
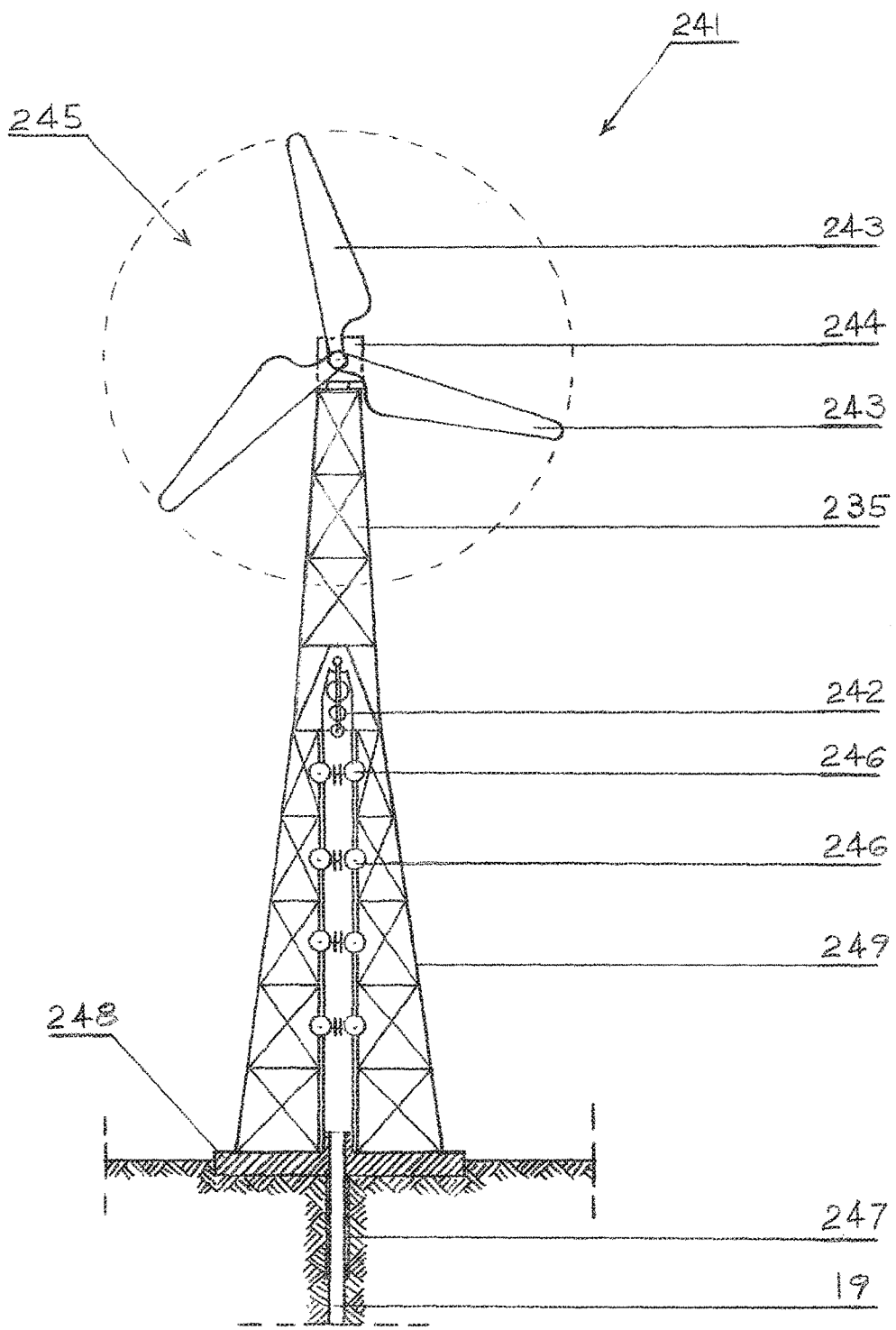
FIG. 21 illustrate a cross sectional view of an alternative tower for assembling, lowering or lifting the self contained in-ground geothermal generator, with wind mill installed on it, in accordance with the invention.

FIG. 21 illustrate a cross sectional view of an alternative tower 241 for assembling, lowering or lifting the self contained in-ground geothermal generator 100, with wind mill 245 installed on it, as an additional source of energy if geothermal power plant is located in windy area. The tower 241 is similar as tower 240 illustrated in FIG. 20 with addition of extension element 235. Here are also shown structural frame 249, well 19, lining of the well 247, foundation platform 248, and system of ratchets 242 and 246 for main cable 75 and peripheral cables 74. (Cables are not shown). Also illustrated here are conventional generator with gear box 244 and blades 243. The objective of this addition is to use assembling tower also as a platform for wind mill. It will be understood that the tower 241 may be permanent or temporary.

Figure 22:
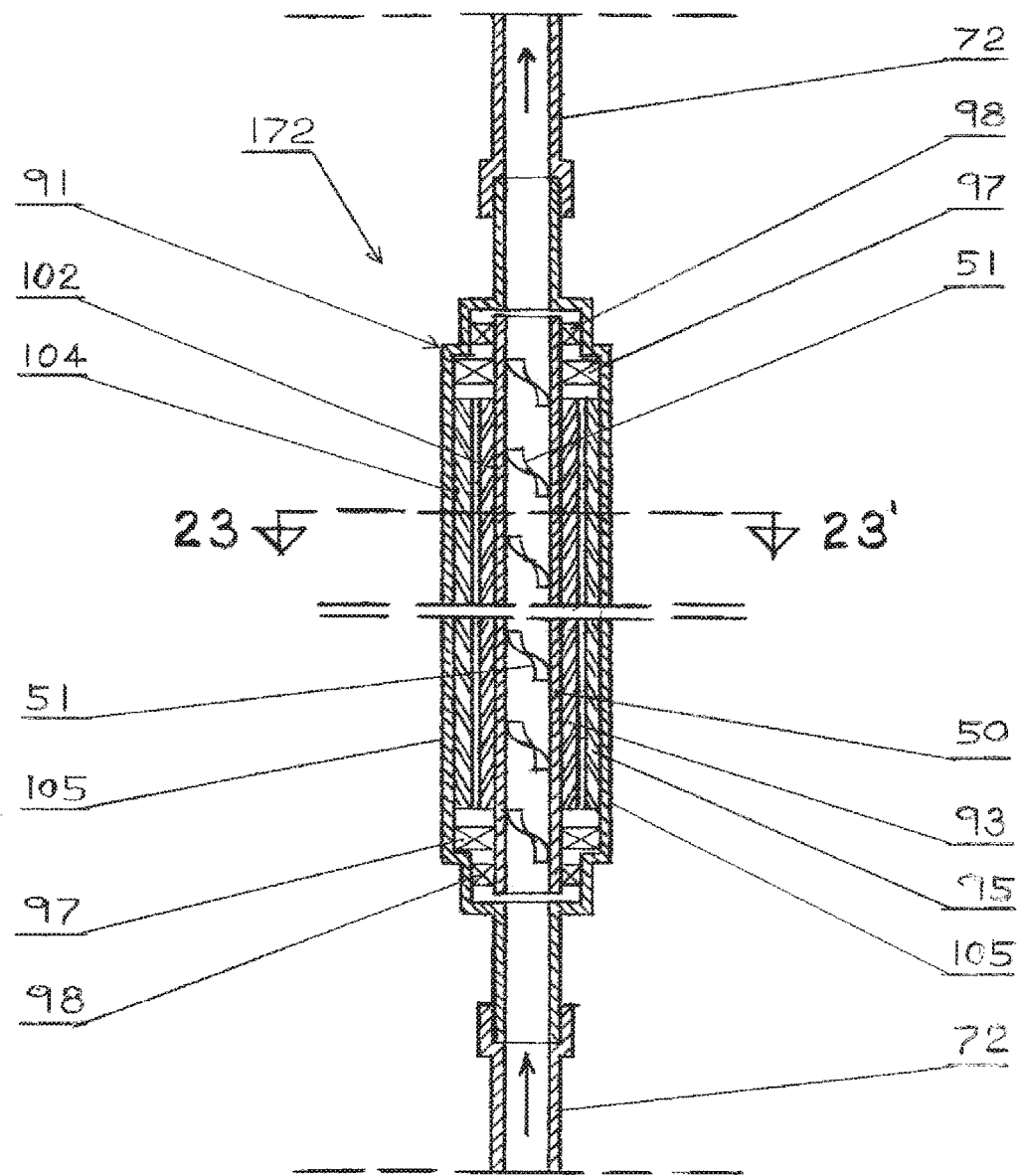
FIG. 22 is a cross sectional view taken along line 22-22' of FIG. 23 of an in-line pump in accordance with the invention.
Figure 23:
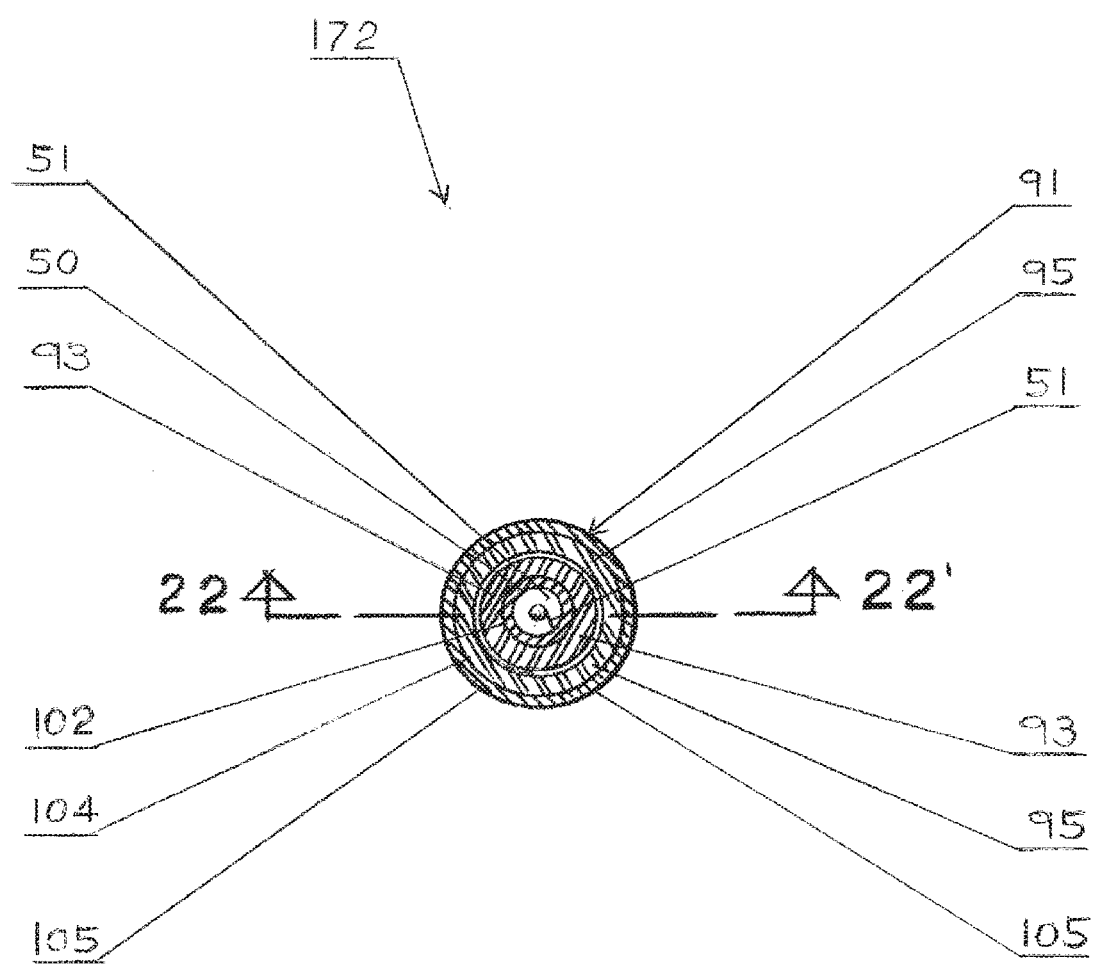
FIG. 23 is a cross sectional view taken along line 23-23' of FIG. 22 of an in-line pump in accordance with the invention.

FIGS. 22 and 23 show an in-line pump 172 which is part of the heat exchange systems of the apparatuses illustrated in FIGS. 12 and 13. The in-line pump 172 also illustrated (numbered) as 174 is a replaceable segment in closed loop line 72 of the heat exchange system of the apparatuses illustrated in FIGS. 12 and 13. In-line pump 172 is an electric motor 91 consisting of a rotor 102 and a stator 104. The rotor 102 consists of a hollow shaft 50 which is fixedly surrounded with an electromagnetic coil 93. The stator 104 consists of a cylinder 105 which is housing of the motor 91 and is fixedly engaged with electromagnetic coil 95. Stator 104 and rotor 102 are engaged through two sets of ball bearings 97 and additional set of sealant bearings 98. The cylinder 105 of the motor 91 has diameter reduction on each end and is coupled with the connector platform 176 which connects segments of the closed loop line 72. The hollow shaft 50 has continuous spiral blades 51 formed on the inner side of the hollow shaft 50. When electro motor 91 is activated the hollow shaft 50 which is central element of the rotor 102 rotates with the continuous spiral blade 51 which is coupled within the hollow central shaft 50 of the rotor 102 creating a force to move fluid through the closed loop line 72. The spiral blade(s) 51 can also be fixed within the hollow central shaft 50. The shape of the inline pump 172 is cylindrical and slim, thus suitable to fit in limited spaces such as well bore. The slim cylindrical shape of the inline pump 172 has no limitation on length therefore power of the electromotor can be increased to provided substantial pumping force as needed for fluid to circulate at certain speed.

The in-line pump 172 can be used in many applications wherever substantial pumping force is needed. For example with minor additions (not shown) like forming extra space by adding an additional peripheral cylinder filled with oil to provide buoyancy to this in-line pump 172 can be used in deep water drilling as a segment of raiser pipe. Further, the closed loop line 72 may be, but is not limited to, a closed loop system line. Alternatively, the in-line pump 172 can be used for pumping up fluid from a reservoir in which underground pressure is low (geo-pressure). For example the in-line pump 172 can be used for pumping up oil from oil wells (reservoirs) in which underground pressure (geo-pressure) is low, or any other type of fluid from a reservoir, such as, but not limited to, water or natural gas. The in-line pump 172 can be inserted as a repetitive segment of the raiser pipe through which oil is pumped up to the ground surface. The in-line pump can be programmed or equipped with sensors so the pump can be activated when submerged or filled with fluid. The hollow shaft 50 with continuous spiral blades 51 formed on the inner side of the hollow shaft can be produced by aligning and welding pre-machined two halves. Alternatively, the shaft can be produced by aligning and welding prefabricated several segments of spiral blade with section of the wall of the hollow shaft (cylinder).

This invention explains a method of how to use unlimited sources of geothermal energy which has not been used in this way today. This invention explains how to use internal heat of our planet and produce electricity deep down and transport it to the surface by cable. This invention explains self contained geothermal generator with its basic elements, their shape, form and interactions and their functions.

In this presentation, turbines, generator, pumps, control valves, safety relief valves, sensors, lubrication line, wiring and cameras are not illustrated in details but there are many reliable, heat resistant, automatic, fast action pumps and control valves, turbines and generators used in power plants, steam engines, marines industry, and the like that may be applicable in embodiments of the present invention. Further, according to particular embodiments of the present invention, the length of the chambers are not limited to the respective size as represented in the drawing figures of this disclosure, but rather they may be of any desired length. In this presentation are explained and illustrated only new elements and function of the invention. All necessary elements and tools that are used in contemporary drilling technology for drilling wellbores including safety requirements casings and blow out preventer (BOP) should be used if necessary. The present invention can be used in many different applications and environments.

The sizes of elements of this invention, such as the diameter, are limited to drilling technology at the time, diameter of the wells and practical weight of the assembly.

Additionally, particular embodiments of the present invention may use a cable, chain or other suitable means for lowering the geothermal generator into pre-drilled hole. The apparatus can be lowered into the well by filling the well first with water and then lowering the apparatus by gradually emptying the well or controlling buoyancy by filling or emptying the boiler of the apparatus with fluids.

Seismicity

Also, the possibility of inducing seismicity is a serious factor to consider during the installation and operation of enhanced geothermal systems. For example, in enhanced geothermal systems that inject water underground, the injected water can accumulate into underground pre-existing pockets (caves) and when critical mass and temperature is reached can induce an explosion which can trigger earthquakes, especially if seismic tension already exists at that area. Embodiments of the present invention do not have the same concern since the working fluid is in a closed loop and would not suffer the same effects of injecting water into underground pre-existing pockets.

Calculations

The SCI-GGG system according to embodiments of the present invention incorporates already proven technology (Boiler, Turbine, Generator, and Condenser). An Organic Rankine Cycle ("ORC") has already been in use over the last 30 years. Basically, an ORC operates on two separate flows of hot and cool liquid. The final numbers of the production and operation of the ORC depends of selected location and accessible temperature. In general, in order to operate the system, the ORC needs a minimum necessary heat of the evaporator within the range of 80° C.-140° C. (176° F.-284° F.). The Condenser needs three times the input heat flow and further needs the necessary heat to be less than 30° C. (86°

F.). The Differential in temperature needs to be 65° C. (125° F.) less than input heat flow temperature.

Maintenance

The basic maintenance of embodiments of the present invention can be managed from a ground surface through maintenance lines which comprise electrical lines used for controlling automation (valves), sensors, cameras, and the like; and a lubrication line for lubricating moving parts (bearings). There is also a service line for controlling and maintaining levels of fluids in the boiler and condenser. For general maintenance such as replacement of bearings, turbines or generator, apparatus may be pulled up from the well-bore and refurnished or trashed or replace it with a new apparatus.

Vertical Approach

Embodiments of the system of the present invention promote a progressive "vertical approach" to reach and utilize heat from hot rocks or other heated surrounding environment rather than horizontal approach used in Enhanced Geothermal System ("EGS"). EGS is based on exploring certain locations (nests) and injecting water in those locations until heat from hot rocks is depleted (about 4-5 years) and then moving to another (preferably nearby) location and then repeating the process and after 3-5 years returning to previous location which would by that time replenish heat generated from radioactive decay and internal heat.

Since SCI-GGG and Self-Contained In-Ground Heat Exchanger ("SCI-GHE") systems use a complete closed loop system there is not a worry about permeability of the rocks, horizontal rock formations and substantial amount of underground water, but rather these systems can operate in a vertical approach. Even if cooling of the surrounding rocks or environment eventually occurs, a user of the system can pull out the apparatus from the well-bore, drill an additional distance to reach hot rocks or surrounding environment and then lower the apparatus at the new depth. The deeper the well is drilled the hotter the rocks will be. Eventually, a point will be reached where heat exchange and heat replenishment will be in balance or equilibrium.

Lava Flow/Tube

In certain locations, like Hawaii, drilling may not be necessary. Two posts on either side of a lava flow/tube can be erected with cable extended between them, like a bridge, and either of apparatuses SCI-GGG and/or SCI-GHE can be lowered close to lava with binary power unit nearby on the ground and electricity can be produced.

Dry Rock & Hydrothermal Reservoir

Although main purpose of the Scientific Geothermal Systems (SCI-GGG & SCI-GHE) is to use limitless dry hot rocks for production of electricity, is not limited to dry hot rocks—it can be lowered into existing hydrothermal reservoir.

In another embodiment, the SCI-GHE could be also easily used in reverse order to heat (warm) the ground (or surroundings) if needed. For example, and without limitation, to extract oil, which is in solid state, the oil needs warming in order to be liquefied. Today they are injecting hot water or other necessary fluid or gas into ground that warms the solidified oil. That water loses a lot of heat on the way down and also gets mixed with the oil and later, when pumped out to the surface, has to be separated from the oil. With a SCI-GHE the ground can be warmed effectively by heating water (fluids) on the ground surface in boiler 220 and circulating it to heat exchanger 168 deep down through thermally insulated pipes 72 so that heat is not lost during fluid circulation. Alternatively, if needed, additional open loop line can be installed to deliver necessary substance, fluid, CO2, etc. to be dispersed through cracks, fissures into surrounded solidify oil formation and be heated by heat exchanger 168 to liquefy oil for easier extraction.

Other embodiments include cooling a dysfunctional nuclear reactor after a possible accident. A first coiled pipe (Heat Exchanger 168) may be lowered into a damaged nuclear reactor and a second coiled pipe (Heat Exchanger 182) into nearby cold reservoir, or if nearby an ocean. This can be repeated with many such apparatuses. Several SCI-GHEs may be used to cool the reactor and surrounding area with a closed loop system. This is better than the current approach of pouring water on the reactor with fire truck equipment (or alike) and then collecting runaway water into reservoirs on nearby sites. That is an open loop system and it contaminates the ground as well as possible ground water. Also, water used for it is contaminated and requires careful disposal.

Another embodiment may be used for cooling mines. In some deep mines, miners have problem with heat reaching temperatures over 100 F. A SCI-GHE could operate to cool the surrounding environment within a deep mine. A first coiled pipe (Heat Exchanger 168) could be laid on a walkway or any appropriate locations inside the mine, and a second coiled pipe (Heat Exchanger 182) may be placed up on the ground surface preferably in a cool environment, such as a shaded area or a body of water. The first and second coiled pipes (Heat Exchangers) are connected with thermally insulated pipes 72 to prevent heat/cold exchange in long lines between the Heat Exchangers. Several inline pumps may be required to force fluid flow quickly through the system. It would absorb heat from mine and exchange it outside in the colder environment.

Further, another embodiment includes utilizing oil wells that are abandoned or about to be abandoned. These wells are typically referred to as "Stripper Wells" or "Marginal Wells." These wells are determined to be in this state if they produce less than 10 barrels of oil per day. Most of these wells are very hot and at a depth of several miles. The heat in these wells may be utilized by implementing SCI-GGG and/or SCI-GHE systems. The system may be sized and shaped to fit within the diameter of the well and lowered in to function as described above. A slim, powerful, in-line pump will make fluid flow fast and minimize heat lost during the operation of the system. Additionally, the in-line pump design could be used for pumping oil up on surface from oil wells without underground pressure.

The embodiments and examples set forth herein were presented in order to best explain the present invention and its particular application and to thereby enable those of ordinary skill in the art to make and use the invention. However, those of ordinary skill in the art will recognize that the foregoing description and examples have been presented for the purpose of illustration and example only. The description as set is not intended to be exhaustive or to limit the invention to the precise form disclosed. Many modifications and variations are possible in light of the teachings above without departing from the spirit and scope of the invention.

What is claimed is:
1. A binary power plant comprising:
   at least one self-contained heat-exchanger, comprising:
   a closed-loop line comprising:
   a first heat-exchanger coil located at a heat source;
   a second heat-exchanger coil located at a different location than the heat source;

wherein the second heat-exchanger coil is coupled to a binary power unit comprising a working fluid having a boiling temperature lower than the boiling temperature of water wherein the binary power unit generates electricity in response to the exchange of heat from the first heat exchanger coil at the source of heat; and a water pump inserted along the closed-loop line;

a structural pipe coupled to the first heat-exchanger coil, wherein the structural pipe provides structural strength to the first-heat-exchanger coil with the first heat-exchanger coil coiled around the structural pipe; and wherein a plurality of the at least one self-contained heat-exchangers are coupled to a plurality of the binary power units.

2. The binary power plant of claim 1, wherein the water pump comprises a series of in-line pumps periodically inserted along the closed-loop line.

3. The binary power plant of claim 2, wherein the each of the in-line pumps comprise an electromotor comprising a spiral blade within a hollow central shaft of a rotor creating a force to move fluid through the closed-loop line.

4. The binary power plant of claim 1, wherein the first heat-exchanger coil comprises a heat conductor formed of a metal coiled tube.

5. The binary power plant of claim 1, wherein the second heat-exchanger coil comprises a heat conductor formed of a metal coiled tube.

6. The binary power plant of claim 1, wherein the closed-loop line between the plurality of self-contained heat-exchangers is thermally insulated to prevent heat exchange between the plurality of self-contained heat exchangers.

7. The binary power plant of claim 1, wherein the first heat-exchanger coil located at a heat source is located at a damaged nuclear reactor.

8. The binary power plant of claim 1, wherein the first heat-exchanger coil located at a heat source is located at a warm mine.

9. The binary power plant of claim 1, wherein the first heat-exchanger coil located at a heat source is located at a lava flow and the second heat-exchanger coil is coupled to the binary power plant, which is a binary geothermal power plant.

10. The binary power plant of claim 1, wherein the first heat-exchanger coil located at the heat source is located at a marginal oil well and the second heat-exchanger coil is coupled to the binary power plant, which is a binary geothermal power plant.

* * * * *